United States Patent
Wolf

(10) Patent No.: US 7,058,843 B2
(45) Date of Patent: Jun. 6, 2006

(54) METHOD AND APPARATUS FOR COMPUTER NETWORK ANALYSIS

(75) Inventor: Gregory H. Wolf, Westfield, NJ (US)

(73) Assignee: Infonet Services Corporation, El Segundo, CA (US)

( * ) Notice: Subject to any disclaimer, the term of this patent is extended or adjusted under 35 U.S.C. 154(b) by 915 days.

(21) Appl. No.: 09/921,860

(22) Filed: Aug. 1, 2001

(65) Prior Publication Data

US 2002/0147937 A1 Oct. 10, 2002

Related U.S. Application Data

(60) Provisional application No. 60/262,112, filed on Jan. 16, 2001.

(51) Int. Cl.
*G06F 11/00* (2006.01)

(52) U.S. Cl. ............................................ 714/4; 709/224
(58) Field of Classification Search .................. 714/4, 714/37, 38, 43, 44, 47; 709/220, 221, 224, 709/223; 370/252, 230
See application file for complete search history.

(56) References Cited

U.S. PATENT DOCUMENTS

| | | | |
|---|---|---|---|
| 5,600,632 A | | 2/1997 | Schulman |
| 6,061,722 A | * | 5/2000 | Lipa et al. .................. 709/224 |
| 6,393,480 B1 | * | 5/2002 | Qin et al. .................... 709/224 |
| 6,397,359 B1 | * | 5/2002 | Chandra et al. ............. 714/712 |
| 6,415,289 B1 | * | 7/2002 | Williams et al. .............. 707/10 |
| 6,711,137 B1 | * | 3/2004 | Klassen et al. .............. 370/252 |
| 2002/0099818 A1 | * | 7/2002 | Russell et al. ............... 709/224 |
| 2003/0065763 A1 | * | 4/2003 | Swildens et al. ............ 709/224 |
| 2004/0015582 A1 | * | 1/2004 | Pruthi ......................... 709/224 |

FOREIGN PATENT DOCUMENTS

EP 1 063 816 A2 12/2000

OTHER PUBLICATIONS

Plaat, Aske et al., Sensitivity of Parallel Applications to Large Differences in Bandwidth and Latency in Two–Layer Interconnects, IEEE, Aug. 1999, pp. 244–253.
Morris, Robert, Variance of Aggregated Web Traffic, IEEE, May 2000, pp. 360–366.
European Search Report dated Feb. 17, 2004 for corresponding European application (Application No. EP 02 09 0075).

* cited by examiner

*Primary Examiner*—Nadeem Iqbal
(74) *Attorney, Agent, or Firm*—Christie, Parker & Hale, LLP

(57) ABSTRACT

A method and system for computer network analysis. A test network is configured and test scenarios are run using exemplary software applications. Trace data including network response and load information is collected during the test scenarios. The trace data is used as input data into various network analysis tools. The network analysis tools evaluate the computer network's response using a variety of criteria. A final report is generated proposing a computer network configuration suitable for satisfying the requirements of the exemplary software applications.

27 Claims, 9 Drawing Sheets

| Bandwidth (Kbps) | Scenario 1 (Sec) | Scenario 2 (Sec) | Scenario 3 (Sec) | Scenario 4 (Sec) | Scenario 5 (Sec) |
|---|---|---|---|---|---|
| 56 | 227.66 | 229.41 | 232.91 | 236.41 | 239.91 |
| 255.2 | 210.66 | 212.41 | 215.91 | 219.41 | 222.91 |
| 454.4 | 208.57 | 210.32 | 213.82 | 217.32 | 220.82 |
| 653.6 | 207.75 | 209.5 | 213 | 216.62 | 220.78 |
| 852.8 | 207.31 | 209.06 | 212.56 | 216.62 | 220.78 |
| 1052 | 207.04 | 208.79 | 212.46 | 216.62 | 220.78 |
| 1251.2 | 206.86 | 208.61 | 212.46 | 216.62 | 220.78 |
| 1450.4 | 206.72 | 208.47 | 212.46 | 216.62 | 220.78 |
| 1649.6 | 206.62 | 208.37 | 212.46 | 216.62 | 220.78 |
| 2048 | 206.48 | 208.29 | 212.46 | 216.62 | 220.78 |

Bandwidth
STDEV: 6.48 | 6.48 | 6.37 | 6.20 | 6.01
Avg. STDEV: 6.31

Latency
STDEV (Rows 1-5): 5.01 | 5.01 | 5.01 | 5.29 | 5.51
STDEV (Rows 6-10): 5.64 | 5.72 | 5.79 | 5.83 | 5.89
Avg. STDEV: 5.47

Sensitivity is to BANDWIDTH

FIG. 5

METHOD AND APPARATUS FOR COMPUTER NETWORK ANALYSIS

CROSS-REFERENCE TO RELATED APPLICATIONS

This application claims the benefit of U.S. Provisional Application No. 60/262,112 filed on Jan. 16, 2001 which is hereby incorporated by reference as if set forth in full herein.

BACKGROUND OF THE INVENTION

This invention relates generally to the field of computer network analysis and more specifically to the analysis of computer networks using a hybrid method employing analytical and discrete event simulation methodologies.

Global Frame Relay (GFR) services provide a class of service functionality between any two sites in the world that communicate across a computer network. This class of service functionality, called Customized Networking Options (CNOs), provides the ability to segregate network traffic across different prioritized GFR permanent virtual circuits (PVCs) based on various protocol and software application criteria.

An advantage of segregating software application traffic across different priority GFR CNOs is that during times of network congestion higher priority traffic receives preferential treatment over lower priority traffic. Software applications using a network comprising GFR CNOs exhibit different performance characteristics. In order to design a network correctly, it is advantageous to understand the nuances of a software application that will run over the network.

Therefore, a need exists for a network analysis system to monitor and analyze the actual network demands of a running software application within a real-world networking environment. The present invention meets such need.

SUMMARY OF THE INVENTION

In one aspect of the invention, a method is provided for determining a computer network's performance during operation of a software application using the computer network. The method includes recording network traffic data while the software application is using the computer network. A latency sensitivity metric is generated from the network traffic data. A bandwidth sensitivity metric is generated from the network traffic data as well. The latency sensitivity metric and the bandwidth sensitivity metric are then compared to determine the computer network's performance during operation of the software application.

In another aspect of the invention, the method for determining a computer network's performance during operation of a software application using the computer network includes calculating the latency sensitivity metric by generating from the network traffic data a plurality of computer network response times for a plurality of software application use scenarios at a constant computer network bandwidth value and generating the latency sensitivity metric from the plurality of computer network response times. In one embodiment of the method, the latency sensitivity metric is generated by calculating the standard deviation of the plurality of network response times. In another embodiment of the method, the latency sensitivity metric is generated by calculating the slope of a line defined by plotting the plurality of computer network response times versus the plurality of software application use scenarios.

In another aspect of the invention, the method for determining a computer network's performance during operation of a software application using the computer network includes calculating the bandwidth sensitivity metric by generating from the network traffic data a plurality of computer network response times for a plurality of computer network bandwidth values for a software application use scenario and generating the bandwidth sensitivity metric from the plurality of computer network response times. In one embodiment, the bandwidth sensitivity metric is generated by calculating the standard deviation of the plurality of network response times. In another embodiment, the bandwidth sensitivity metric is generated by calculating the slope of a line defined by plotting the plurality of computer network response times versus the plurality of computer network bandwidth values.

In another aspect of the invention, the network traffic data is used to generate a return on investment data table for use in generating a return on investment metric and a computer network simulation table for use in simulating a second computer network.

In another aspect of the invention, a data processing system is adapted to determine a computer network's performance during operation of a software application using the computer network. The data processing system includes a processor and a memory operably coupled to the processor. The memory has program instructions stored therein and the processor is operable to execute the program instructions. The program instructions include: receiving network traffic data recorded while the software application is using the computer network; generating from the network traffic data a latency sensitivity metric; generating from the network traffic data a bandwidth sensitivity metric; and comparing the latency sensitivity metric and the bandwidth sensitivity metric to determine the computer network's performance during operation of the software application.

BRIEF DESCRIPTION OF THE DRAWINGS

FIG. 5 depicts an embodiment of a sensitivity data table extracted from the network traffic data stored by the network analyzer during an actual test environment run;

DETAILED DESCRIPTION OF THE INVENTION

The present invention is a system used to collect and analyze network traffic data collected from a test environment network wherein the network traffic within the test environment network includes network traffic generated by application transactions. The resultant analysis is used to design data networks based on a software application centric approach.

A task of network design is to accurately predict how software applications will perform under certain conditions. Network modeling can be performed using several different methodologies. One network modeling methodology is to use mathematical algorithms to estimate link (or virtual circuit) utilization and network latency. However, protocol effects are difficult to capture. Important protocol aspects that are extremely difficult to represent in a mathematical network model include data segmentation, congestion control, re-transmissions, load balancing across multiple routes, and sophisticated algorithms employed within different protocol layers such as selective acknowledgments in Transmission Control Protocol(TCP) or weighted fair queuing in Internet Protocol (IP).

Another network modeling methodology is to use discrete event simulation methods. By either manually building the unique characteristics of a network and its various components or drawing upon a library of predefined components, explicit network traffic is generated creating an accurate baseline of network traffic data. Once this baseline is created, multiple network design scenarios can be simulated in order to determine a multitude of network and application metrics such as application response time, link utilization, and throughput. These scenarios can include an increase in the user population over time or the addition of new software applications. The advantage of using discrete event simulation methods is that the model can accurately reflect the uniqueness and nuances of a specific software application and/or network.

The present invention is a modeling tool that uses a hybrid approach combining analytical and discrete event simulation methods.

Figure 1:
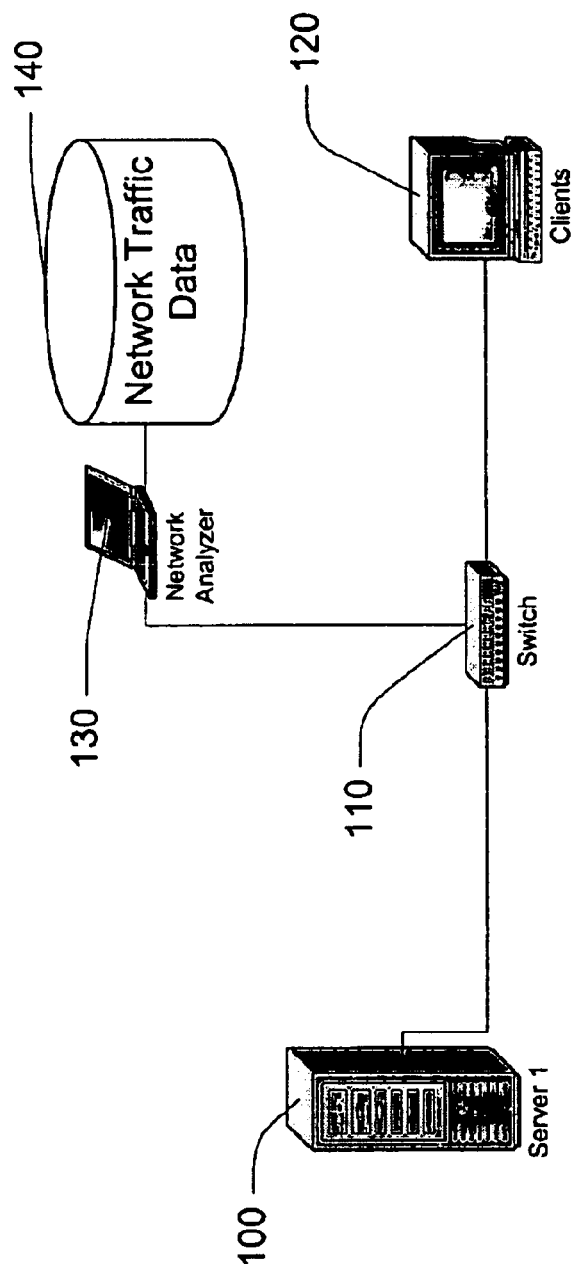
FIG. 1 is a network diagram of an exemplary test environment network for collecting network traffic data.

FIG. 1 depicts one embodiment of a test environment for collection of network traffic data. The test environment is used to collect network traffic data during actual usage of software applications running on a computer network. The test environment is configured to match the logical and physical configuration of a portion of an actual network as the actual network is used in a real-world implementation. In one exemplary embodiment according to the present invention, a server 100 is operably coupled to a client 120 via a computer network comprising a networking device such as a network switch 110. The network switch is operably coupled to a network analyzer 130 that collects network traffic data and stores the network traffic data on a permanent data storage device 140 for later use.

In operation, the client hosts a software application that requests and receives data from the server. The application is invoked on the client and a suite of test operations are run using the software application. The test operations simulate the actual demand placed on the software application and network by a user. The network analyzer records statistics about the data traffic within the network between the client and server and stores data describing the network traffic in a network traffic database or file of network traffic traces. The network traffic data is used as the input for a combination of analysis and reporting tools.

In other embodiments of the present invention, the number of software applications, clients, servers, network devices, and network analyzers are varied within the test environment to recreate the elements of an actual computer network. Furthermore, the suite of tests run using an application is varied to match actual usage scenarios.

Figure 2:
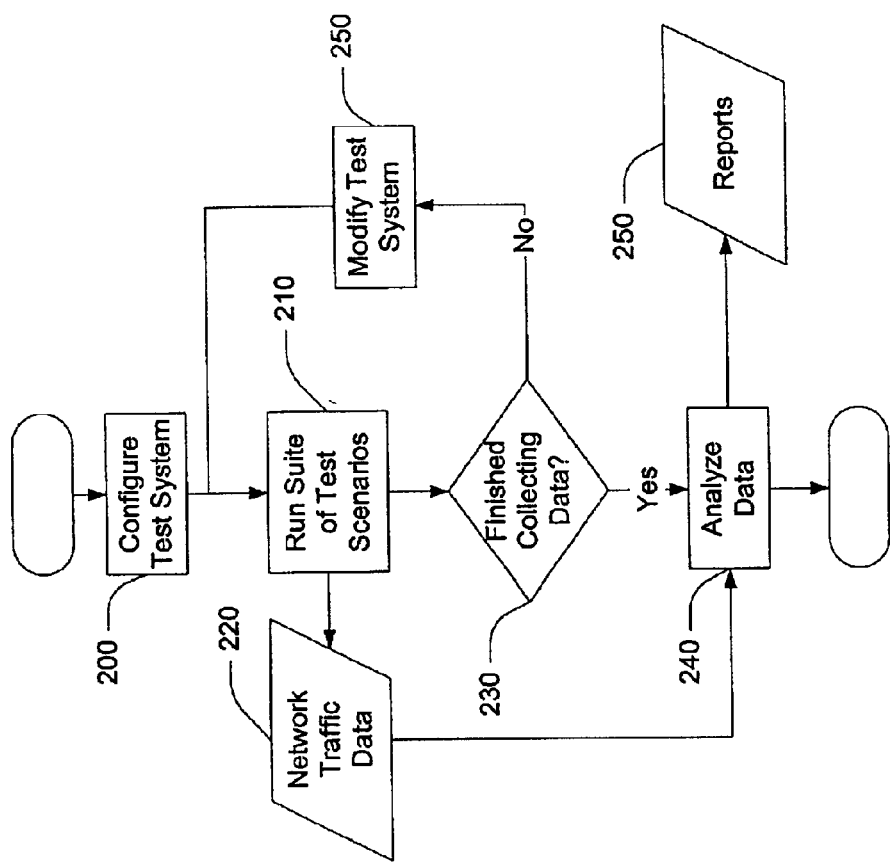
FIG. 2 is a process flow diagram of one embodiment of a process for collecting network traffic data according to the present invention.

FIG. 2 is a process flow diagram of one embodiment of a process for collecting network traffic data according to the present invention. The test environment is configured during step 200 and a suite of test scenarios are run during step 210. The network analyzer collects information about application generated transactions and network traffic data and stores the network traffic data 220. A determination is made of whether or not to continue collecting network traffic data at step 230. If the test is finished, the collected network traffic data is analyzed at step 240 and reports 250 describing the test environment network are created. If more network traffic data is to be collected, the test environment network is modified at step 250 and a new suite of test scenarios are run at step 210.

In one embodiment of the present invention, the suite of test scenarios is designed to collect additional network traffic data under increasing load demands on an existing network test environment configuration.

In one embodiment of the present invention, the test environment is modified in steps with increasing amounts of effective bandwidth made available to a software application running within the test environment.

Figure 3:
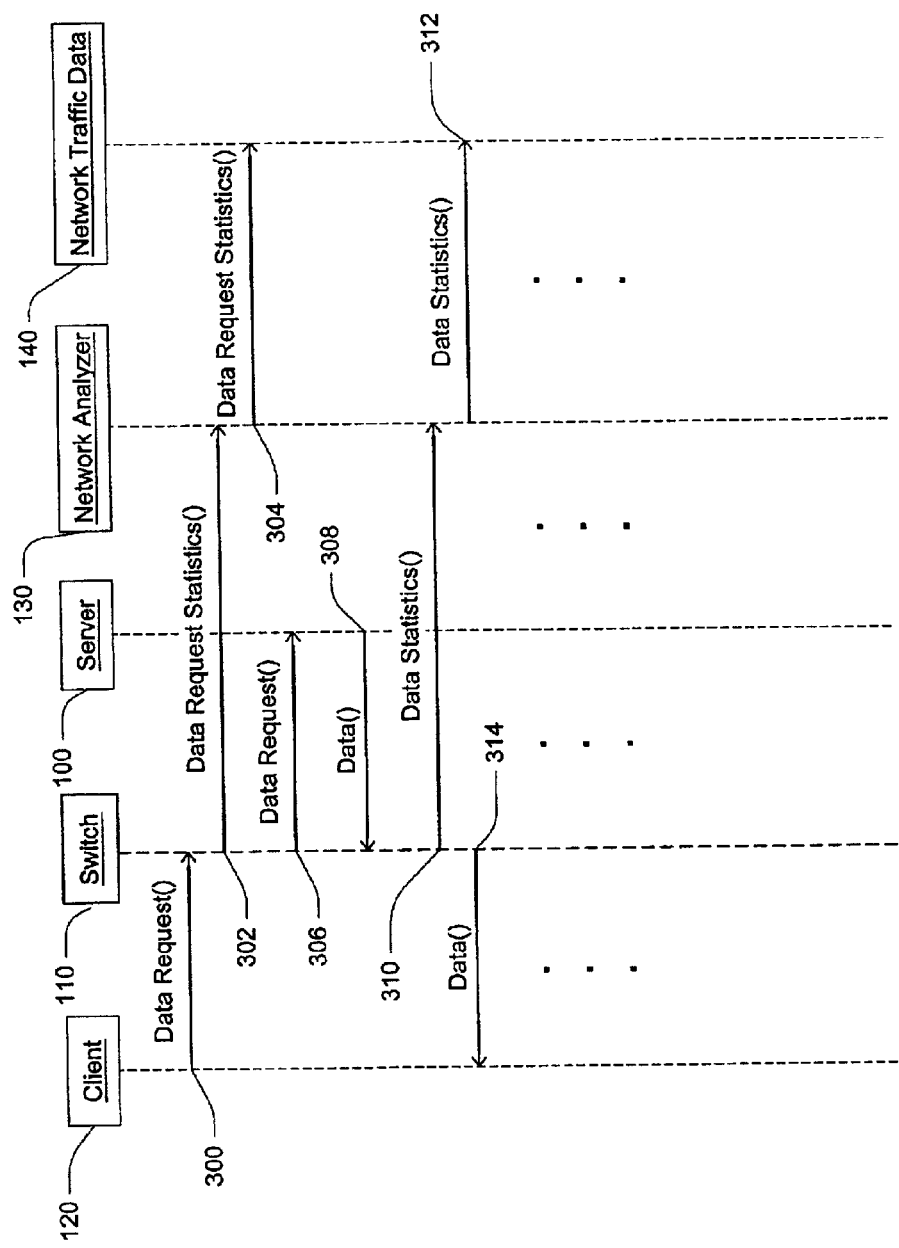
FIG. 3 is a sequence diagram depicting an embodiment of a network traffic data collection process according to the present invention.

FIG. 3 is a sequence diagram depicting an embodiment of a network traffic data collection process according to the present invention. A client 120 sends a data request 300 to a server 100 via a network device such as switch 110. A network analyzer collects statistics about the data request 302 from the switch and stores the data request statistics 304 in a network traffic data store 140. The switch forwards the data request 306 to the server and the server sends response data 308 to the client via the switch. The network analyzer collects statistics 310 about the data being sent to the client from the server and stores the data statistics 312 in the network traffic data store. The switch forwards the response data 314 to the client. The request and response cycle is repeated continuously and data statistics are stored for each request and response. The stored statistics comprise a data trace describing the network traffic during the test scenarios.

In one embodiment of the present invention, the data statistics include a time stamp for each request and data statistic collected and stored by the network analyzer.

In one embodiment of the present invention, the data statistics include the size in bytes of each request, the size in bytes of the overhead associated with each request, the total size in bytes of the response data, the size in bytes of the overhead associated with each response, and the duration in seconds of the request/response interaction.

In one embodiment of the present invention, a Sniffer Pro LAN seven layer network analyzer as supplied by Sniffer Technologies of Santa Clara, Calif. is used to collect network traffic data.

Figure 4:
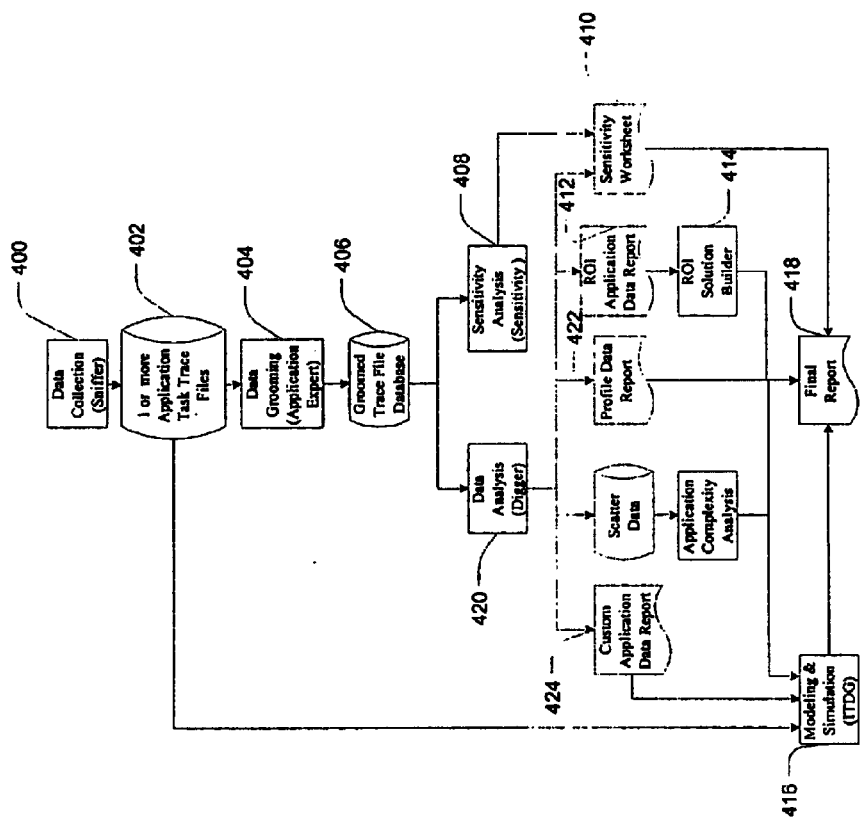
FIG. 4 is a data flow diagram depicting the data flow in one embodiment of the network analysis program.

FIG. 4 is a data flow diagram depicting the data flow in one embodiment of the network analysis program. Data is collected from the previously described test environment network in the previously described data collection process 400. Portions of the data files 402 pertaining to a single software application's requests and server responses are used by a modeling and simulation analysis tool 416 to make network design decisions based on network modeling and simulation scenarios. An exemplary modeling and simulation analysis tool suitable for use is "IT DecisionGuru" available from OPNET Technologies Inc. of Washington D.C., USA.

A database creator 404 is used to create a database 406 from the network traffic data 402 collected by the network analyzer. An exemplary embodiment of a database creation tool suitable for use is Application Expert supplied by Compuware Corporation of Farmington Hills, Mich., USA. A proprietary data extractor 420 is used as a front end to the database by other applications and data analysis tools. The data extractor searches the database for data appropriate for each application or data analysis tool. The appropriate data is then used to create a data file suitable for each application or data analysis tool.

In one embodiment of a data extractor according to the present invention, the data extractor applies a weighting function to the statistics generated from the network traces created during the data collection phase. For example, if the test scenario included use of a client application to enter data into a database using a database server and a client application for generating a report from the database, the use of the client applications will differ. The reporting client application may be used ten times as much as the data entry client application during a given time period. In this case, the data extractor weights the reporting client application's network usage ten times heavier than the data entry client application's network usage.

An exemplary output report created by the data extractor is a profile data report 422 containing a synopsis of the data traces collected during the test phase of the network analysis. The profile data report includes the following information in a tabular format:

| Column Name | Description |
| --- | --- |
| Total Bytes | Total bytes transmitted. |
| App Turns | Total application turns. |
| Bytes/App Turn | Calculation based on Total Bytes/App Turns. |
| Client Bytes - Total | Total bytes sent from the client to the server. |
| Client Bytes - Payload | Total amount of application data sent from the client to the server. |
| Client Bytes - Overhead | Calculation based on the sum of the Client Bytes - Client Payload Bytes/Client Bytes expressed as a percentage. |
| Server Bytes - Total | Total bytes sent from the server to the client. |
| Server Bytes - Payload | Total amount of application data sent from the server to the client. |
| Server Bytes - Overhead | Calculation based on the sum of the Server Bytes - Server Payload Bytes/Server Bytes expressed as a percentage. |
| Ratio | Calculation based on either the Client Bytes/Server Bytes OR Server Bytes/Client Bytes depending on the initial values of Client Bytes and Server Bytes. |
| Duration | Total amount of elapsed time (in seconds). |
| Overall Protocol Overhead | Calculation based on the sum of the (Server + Client Bytes) - (Server + Client Payload Bytes)/(Server + Client Bytes) expressed as a percentage. |
| Overall Server to | Calculation based on either the |

-continued

| Column Name | Description |
| --- | --- |
| Client Ratio | Total Client Bytes/Total Server Bytes OR Total Server Bytes/Total Client Bytes depending on the initial values of Total Client Bytes and Total Server Bytes. |
| Average Client Transaction | Geometric mean of Client Total Bytes based on all individual tasks. |
| Average Server Transaction | Geometric mean of Server Total Bytes based on all individual tasks. |
| RV | Specifies the Report Version |

Another exemplary output report created by the data extractor is a custom application data report 424 containing information used in the creation of custom applications within the previously described IT DesignGuru modeling and simulation tool. The custom application data report includes the following information in a tabular format:

| Column Name | Description |
| --- | --- |
| Duration | Total amount of elapsed time (in seconds). |
| Total Bytes | Total payload bytes transmitted. |
| Payload - Client | Total amount of application data sent from the client to the server. |
| Payload - Server | Total amount of application data sent from the server to the client. |
| Frames - Client | Total number of packets sent from the client to the server. |
| Frames - Server | Total number of packets sent from the server to the client. |
| Packet Size - Client | Average size of payload information that was sent from the client to the server. |
| Packet Size - Server | Average size of payload information that was sent from the server to the client. |

A sensitivity analyzer 408 is used to determine whether or not the software applications simulated and used in the test environment are most sensitive to network latency or to network bandwidth. The sensitivity tool analyzes the data traces taken from the test system and determines for each application whether or not the application is most sensitive to latencies in data transfers or to the effective bandwidth of the computer network. The results from the sensitivity analysis tool are displayed in a sensitivity data table 410.

FIG. 5 depicts one embodiment of a sensitivity data table extracted from the network traffic data stored by the network analyzer during an actual test environment run. The sensitivity data table contains the network traffic data used to determine if a software application using the test environment network is most sensitive to network latency or to network bandwidth. The sensitivity data table comprises measured durations for a request/response interaction between a software application and a server under different simulated test environment configurations and testing scenarios. The effective bandwidth of the test environment network is fixed and then a series of simulated test scenarios are run creating varying demands on the test environment network. The fixed effective bandwidth of the test environment network is placed in column 500. In this example, the effective bandwidth starts at 56 Kbps and is increased in steps to 2,048 Kbps. Subsequent columns 502, 503, 506, 508, and 510 contain the duration values for test scenarios comprising the test suite. In this example, the duration values from the first test scenario are in column 502.

Reading the table along a single row of the sensitivity data table indicates the sensitivity of the application to the latency of the network. For example, reading the data along row 504 of the sensitivity data table shows that duration of a request/response transaction increases from 227.66 seconds to 239.91 seconds as the latency of the network increases for a fixed bandwidth of 56 Kbps.

Figure 6:
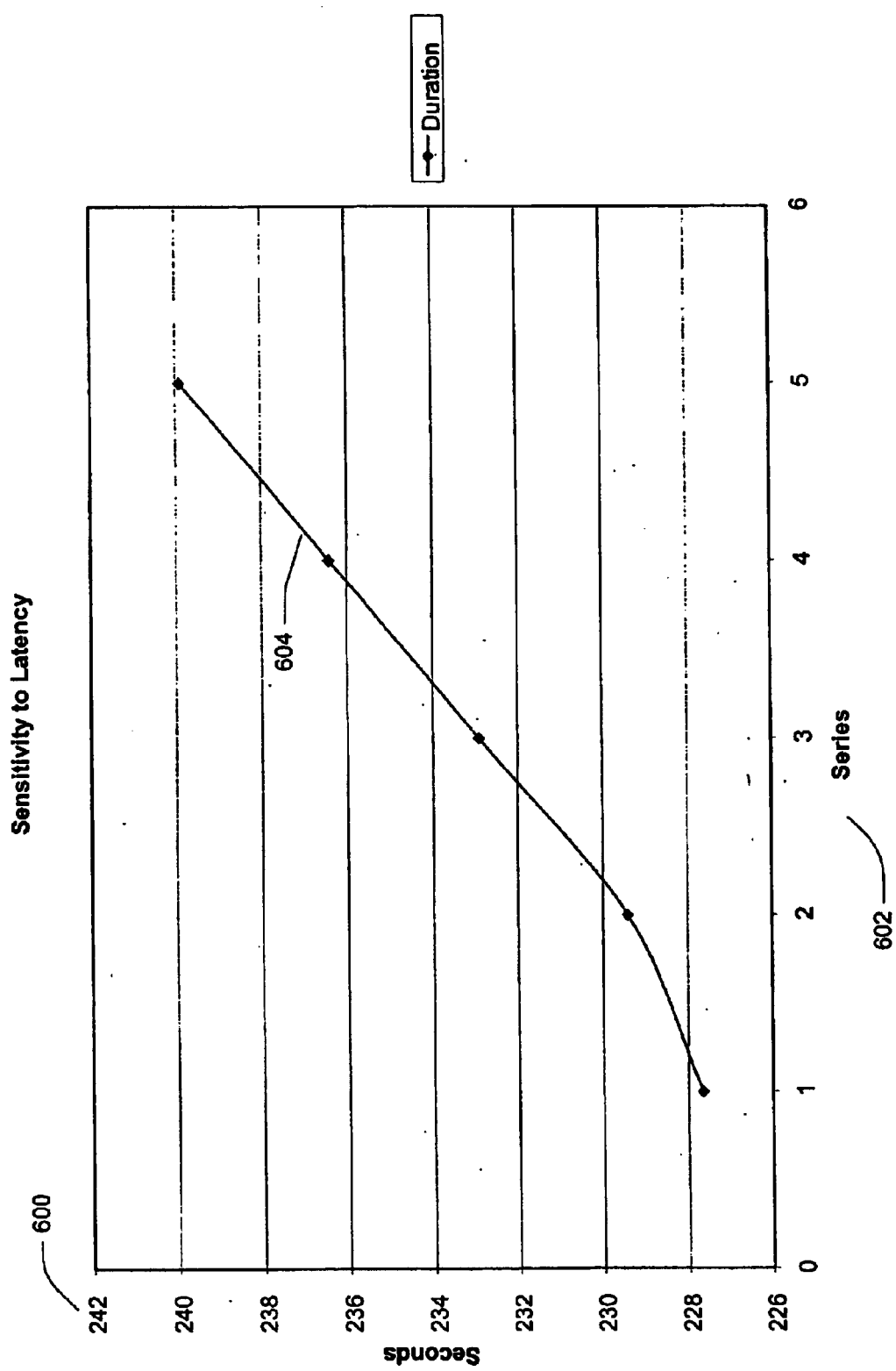
FIG. 6 is a plot of the duration of a software application request and server response transaction versus test scenario taken from the first row of the sensitivity data table of FIG. 5.

FIG. 6 is a plot of duration versus test scenario taken from the first row of the sensitivity data table of FIG. 5. The duration in seconds is along the Y axis 600 and the scenario number is along the X axis 602. The resultant line 604, has a positive slope because the duration of a software application request and server response interaction increases as the load on the test environment Network increases. This indicates that the software application being run on the test environment network is at least partially sensitive to the latency of the test environment network.

Returning to FIG. 5, reading the sensitivity data table along a column indicates the sensitivity of a software application to the effective bandwidth of the test environment network. For example reading down column 502 the duration of a software application request and server response transaction decreases from 227.66 seconds to 206.48 seconds as the effective bandwidth of the test environment network is increased from 56 Kbps to 2048 Kbps. An example of this is given in FIG. 7.

Figure 7:
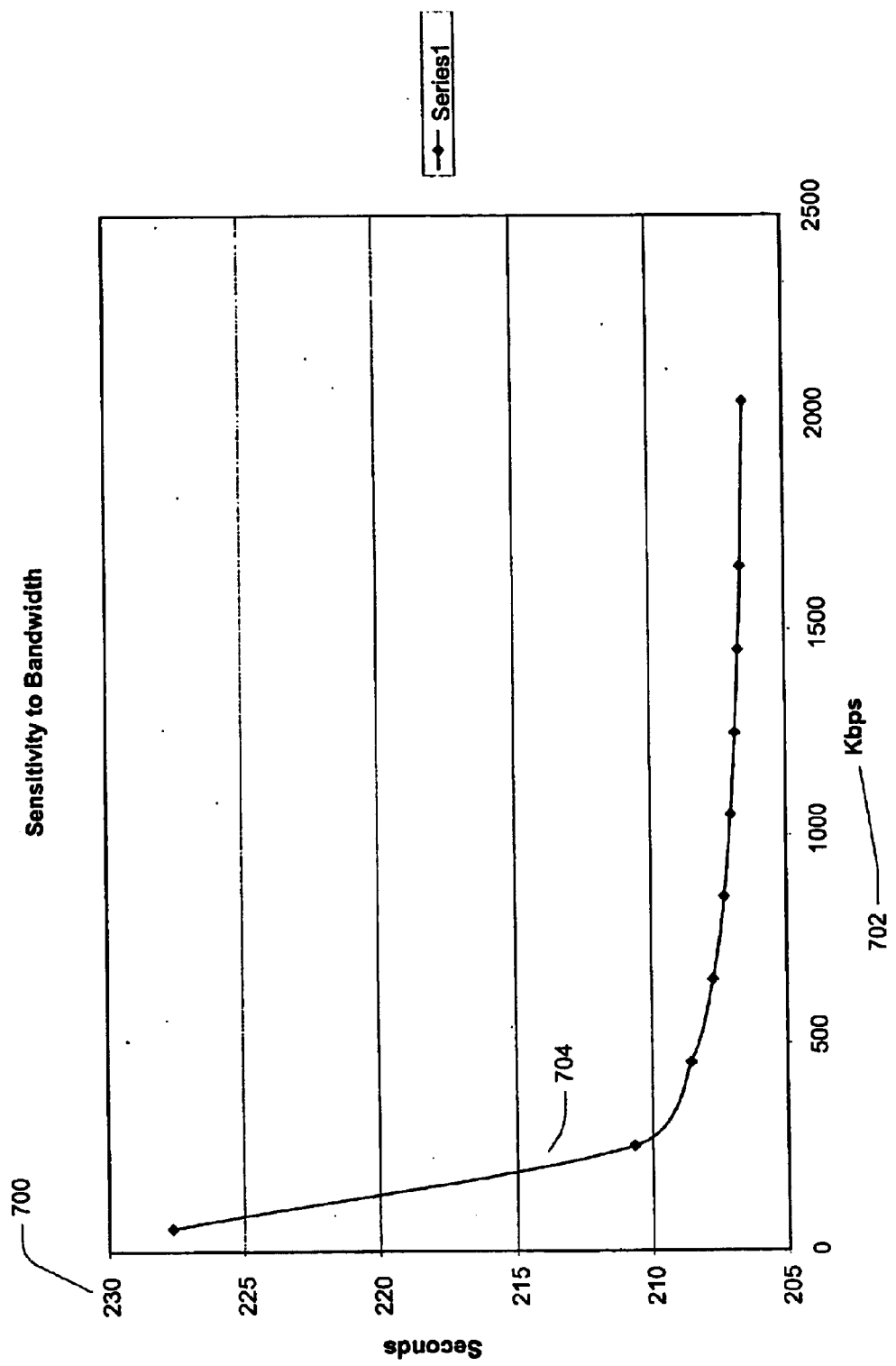
FIG. 7 is a plot of the duration of a software application request and server response transaction versus effective bandwidth of the test environment network taken from the first column of the sensitivity data table of FIG. 5.

In FIG. 7, the duration of a software application request and server response transaction is plotted against the effective bandwidth of a test environment network. The duration in seconds of a client/server request and response interaction is along the Y axis 700 and the effective bandwidth of the test environment network is along the X axis 702. The resultant line 704, has a negative slope because the duration of a client/server request and response interaction decreases with increasing bandwidth. This indicates that the application being simulated on the test environment network is at least partially sensitive to the effective bandwidth of the test environment network.

Returning to FIG. 5, the data in the sensitivity table is used to determine whether or not the software application using the test environment network is most sensitive to the latency or the bandwidth of the test environment network. A sensitivity metric is calculated in order to make this determination. The standard deviation of the average value of the duration of a client/server request and response interaction for a column of the sensitivity data table is an indication of how sensitive the software application using the test environment network is to the effective bandwidth of the test environment network. The higher the standard deviation, the greater the sensitivity. For example, the standard deviation of the durations of software application request and server response interactions for column 502 is 6.48 seconds as shown in field 512. Similarly, the standard deviations of the durations of software application request and server response interactions within a row is an indication of how sensitive the software application using the test environment network is to the latency of the test environment network. For example, the standard deviation of the durations of client/server request and response interactions for row 504 is 5.01 seconds as shown in field 518 in this example.

The combined values of the standard deviations of the durations of software application request and server response interactions along the columns of the sensitivity data table serves as a bandwidth sensitivity metric and the combined values of the standard deviations for the durations of software application request and server response interactions along the rows of the sensitivity data table serves as a bandwidth sensitivity metric. In this example, the average standard deviation for the columns of the sensitivity data table is 6.31 seconds as shown in field 514. This value is used as the bandwidth sensitivity metric for this example. The average standard deviation for the rows of the sensitivity data table is 5.47 seconds as shown in field 520. This value is used as the latency sensitivity metric for this example.

The bandwidth sensitivity metric and the latency sensitivity metric are compared to determine whether the software application using the test environment network is most sensitive to the latency or the bandwidth of the test environment network. In this case, the value of the bandwidth sensitivity metric is 6.31 seconds and the value of the latency sensitivity metric is 5.47 seconds. Therefore, the software application using the test environment network is most sensitive to the bandwidth of the test environment network because the value of the bandwidth sensitivity metric is 6.31 seconds which greater than the value of the latency sensitivity metric of 5.47 seconds. This is shown in the sensitivity data table in the sensitivity result field 522 where the word "BANDWIDTH" is displayed.

In one embodiment of the present invention, the latency and bandwidth sensitivity metrics are calculated as the absolute value of the slope of a best fit line calculated from the durations of software application request and server response interactions.

Figure 8:
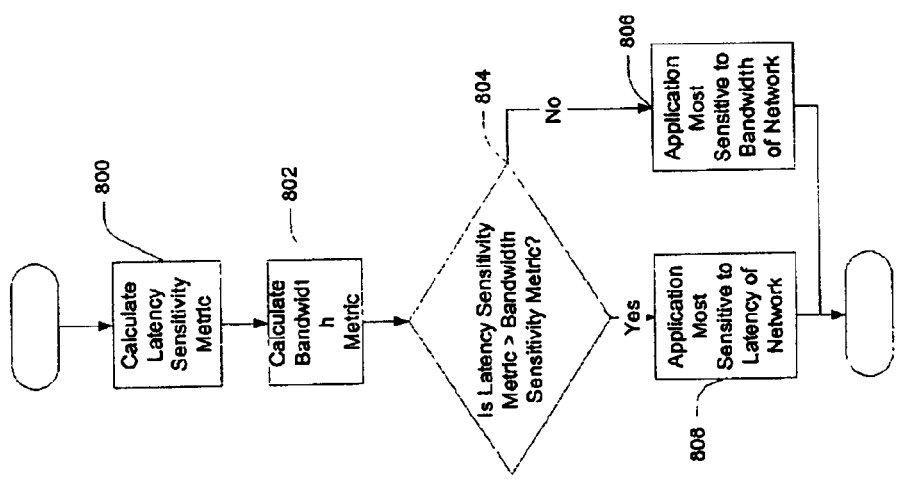
FIG. 8 is a process flow diagram of one embodiment of the process of determining if the software application using the test environment network is most sensitive to the latency or the bandwidth of the test environment network.

FIG. 8 is a process flow diagram of one embodiment of the process of determining if the software application using the test environment network is most sensitive to the latency or the bandwidth of the test environment network. A previously described latency sensitivity metric is calculated 800 using the data from the previously described sensitivity data table. A previously described bandwidth sensitivity metric is calculated 802 using the data from the previously described sensitivity data table. The two values are compared 804. If the latency sensitivity metric is greater than the bandwidth latency sensitivity metric then the application using the test environment network is determined to be most sensitive the latency of the network 808. If the latency sensitivity metric is less than the bandwidth sensitivity metric then the application using the test environment network is determined to be most sensitive the bandwidth of the test environment network 806.

Referring again to FIG. 4, the data extractor creates a Return On Investment (ROI) application report 412 using the trace data collected from the test system. The ROI application report is used as an input into an ROI analysis tool 414 to compare different network configurations from a financial perspective. The ROI analysis tool calculates a financial rate of return on investment for each network configuration in order to help in the decision making process of network service procurement. An exemplary embodiment of a ROI tool is "ROI Solution Builder" available from Infonet Services Corporation of El Segundo, Calif. USA. The ROI data report includes the following information in a tabular format:

| Column Name | Description |
| --- | --- |
| Duration | Total amount of elapsed time (in seconds). |
| App Turns | Total application turns. |
| Client - Bytes | Total bytes sent from the client to the server. |
| Client - Payload | Total amount of application data sent from the client to the server. |
| Client - Packets | Total number of packets sent from the client to the server. |
| Client - Avg. Payload | Average amount of application data sent from the client to the server. |
| Client - OHD | Calculation of the average amount of overhead bytes for a given task that is sent from the client to the server based on the total client bytes - total client payload bytes/total number of client packets. |
| Server - Bytes | Total bytes sent from the server to the client. |
| Server - Payload | Total amount of application data sent from the server to the client. |
| Server - Packets | Total number of packets sent from the server to the client. |
| Server - Avg. Payload | Average amount of application data sent from the server to the client. |
| Server - OHD | Calculation of the average amount of overhead bytes for a given task that is sent from the server to the client based on the total server bytes - total server payload bytes/total number of server packets. |
| Avg. Client OHD | Calculation of the average amount of overhead bytes for the entire application that is sent from the client to the server based on the total client bytes - total client payload bytes/total number of client packets. |
| Avg. Server OHD | Calculation of the average amount of overhead bytes for the entire application that is sent from the server to the client based on the total server bytes - total server payload bytes/total number of server packets. |

The output from each of the tools is combined into a final report 418. An exemplary final report is included in APPENDIX A.

Figure 9:
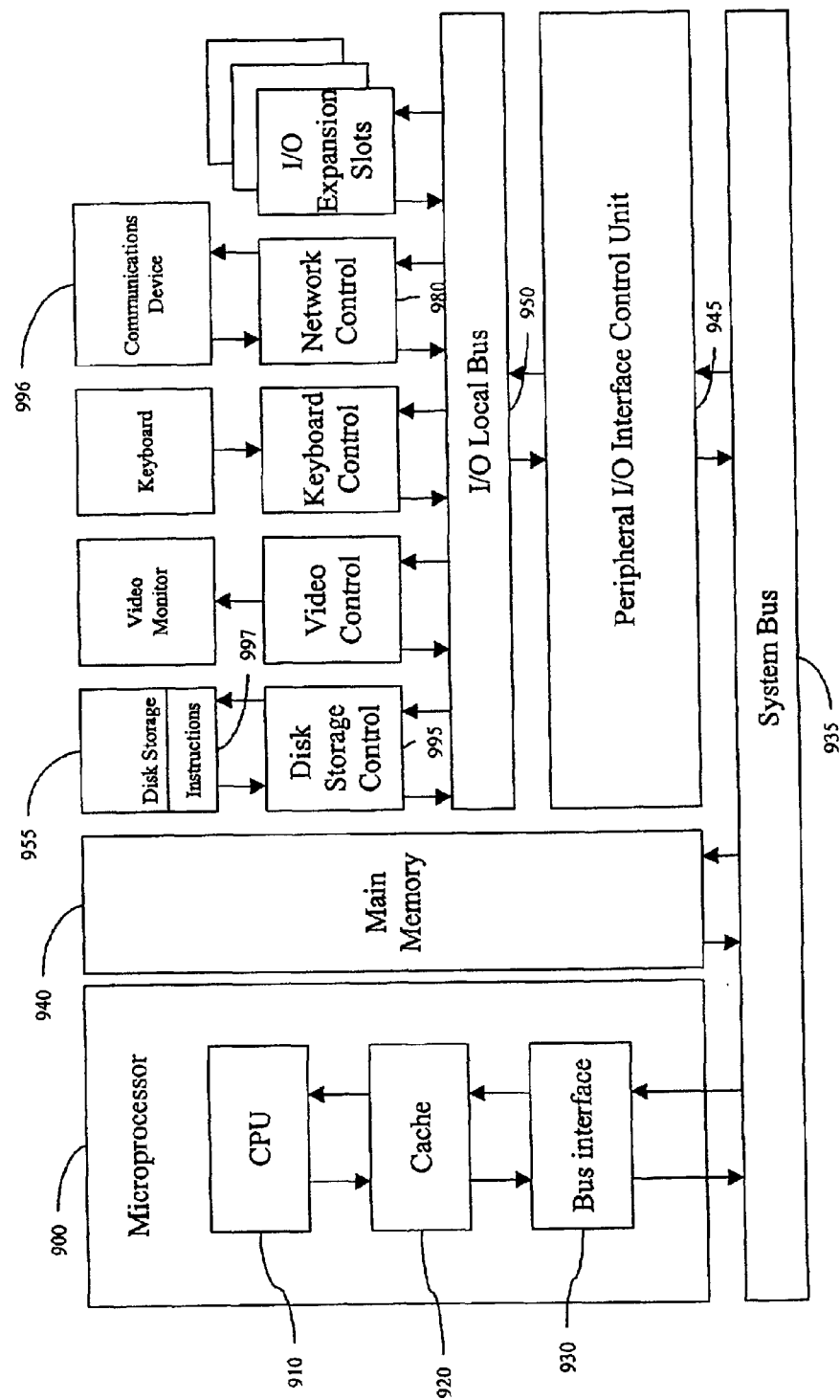
FIG. 9 is a hardware architecture diagram of a general purpose computer suitable for use network analysis program host; and APPENDIX A is an exemplary embodiment of an analysis report generated from the data collected from an analysis.

FIG. 9 is a hardware architecture diagram of a general purpose computer suitable for use network analysis program host. A microprocessor 900, including a Central Processing Unit (CPU) 910, a memory cache 920, and a bus interface 930, is operatively coupled via a system bus 935 to a main memory 940 and a I/O control unit 945. The I/O interface control unit is operatively coupled via a I/O local bus 950 to a disk storage controller 995, and a network controller 980.

The disk storage controller is operatively coupled to a disk storage device 925. Computer program instructions 997 for implementing a network analysis program are stored on the disk storage device until the microprocessor retrieves the computer program instructions and stores them in the main memory. The microprocessor then executes the computer program instructions stored in the main memory to implement the features of a network analysis program.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

APPENDIX A

ABC World Industries

Table of Contents

EXECUTIVE SUMMARY ........................................................................................................... 2

COMPUTING ARCHITECTURE ............................................................................................... 3

PROFILING METHODOLOGY .................................................................................................. 5

NETWORK MODELING ............................................................................................................. 6

TEST ENVIRONMENT ................................................................................................................ 8

TEST RESULTS ............................................................................................................................ 9

SAP R/3 ........................................................................................................................................ 11
    BACKGROUND ..................................................................................................................... 11
    EFFICIENCY ......................................................................................................................... 12
    BANDWIDTH CONSUMPTION ............................................................................................. 12
    SENSITIVITY ........................................................................................................................ 14
    DATA SYMMETRY ............................................................................................................... 15
    SIZING .................................................................................................................................. 15

PROPOSED NETWORK DESIGN ............................................................................................. 16

SUMMARY .................................................................................................................................. 23

Figures

Figure 1: Three-Tier Architecture .................................................................................................. 4
Figure 2: Enterprise Application Network Architecture ............................................................... 5
Figure 3: Test Environment – USA ................................................................................................ 8
Figure 4: Accounts Payable - Test Results .................................................................................. 10
Figure 5: Accounts Receivable - Test Results ............................................................................. 10
Figure 6: SAP Login Process ....................................................................................................... 10
Figure 7: Application Burstiness .................................................................................................. 13
Figure 8: Application Sensitivity ................................................................................................. 14
Figure 9: Sizing - Accounts Payable ............................................................................................ 15
Figure 10: Sizing - Accounts Receivable ..................................................................................... 16
Figure 11: BPO – Circuits ............................................................................................................ 17
Figure 12: BPO – PVCs ............................................................................................................... 18
Figure 13: ADE – Circuits ........................................................................................................... 19
Figure 14: ADE – PVCs ............................................................................................................... 20
Figure 15: XYZ – Circuits ........................................................................................................... 21
Figure 16: XYZ – PVCs ............................................................................................................... 22

Disclaimer - In no event shall     be liable for any indirect, incidental, special or consequential damages arising from or in any way connected with its performance under this Report, such as, but not limited to loss of anticipated profits or other economic loss. Neither   , nor the owner of any program licensed to     or equipment and services acquired by     specifically for performance and delivery against the Work Order, is responsible for Customer's application or results obtained from the use of the provided services, programs or equipment, or for unintended or unforeseen results obtained by Customer in using these services, programs or equipment.     provides this service to the best of its ability using the information provided by all sources available at the time the service is performed.

ABC World Industries

Executive Summary

ABC World Industries (ABC) is a leading manufacturer of flooring and ceiling products and has been an          Services Corporation customer for more than two years. Over time ABC has gone through a number of changes, both technical and organizational, which has prompted a re-evaluation of the network design that was implemented over two years ago.

ABC as an organization is broken up into different business units based on the product that is manufactured.

ABC made another decision to divest itself of its building insulation products, which was called ABC Industrial Products (AIP), which resulted in a separate, autonomous company called XYZ.

The purpose of this document is twofold. The first is to profile the performance characteristics of the accounts payable and accounts receivable components of the SAP R/3 Financials module. The current SAP R/2 system based in Europe will be phased out and all of the SAP R/2 users will migrate over time to the SAP R/3 instance located in USA. Although this transition has not started yet this document will set forth the bandwidth requirements of those components using simulation and network modeling techniques.

The second goal of this document is to present the network re-design of each of the three business entities based on several planning sessions that have transpired during the fall of 2000.

Moving forward this document should be used as a baseline for making network design decisions. It is anticipated that as more information becomes available and more changes are implemented this document will need to be updated to reflect those changes.

This report documents        's findings. All of the methodologies and processes were carried out in accordance with       's Network Analysis Program.

The following three sections provide an overview of computing architectures in general and the processes and methodologies that        uses as part of the Network Analysis Program.

ABC World Industries

Computing Architecture
Deployment of applications across a network requires careful planning and an understanding of several key aspects, such as an application's performance characteristics and computing architecture that it operates on.

Applications generally fall into one of five categories.

> Terminal/Host - The flow of traffic is usually asymmetric. The terminal sends a few characters and the host returns many characters. Telnet is an example of an application that generates terminal/host traffic. The default behavior for Telnet is that the terminal sends a single packet for each character a user types. The host returns multiple characters, depending on what the user typed.

> Client/Server - Client/server is the best known and most widely used traffic type. Examples of client/server implementations include NetWare, AppleShare, Banyan, Network File System (NFS), and Windows NT. The flow of traffic is usually bi-directional and asymmetric. Requests from the client are usually less than 64 bytes, except when writing to the server, in which case they are larger. Responses from the server range from 64 bytes to 1500 bytes or more, depending on the maximum frame size allowed for by the data-link layer in use.

> Peer-to-Peer - The flow of traffic is usually bi-directional and symmetric. Communicating entities transmit approximately equal amounts of protocol and application information and typically there is no hierarchy. Each device is considered as important as each other device, and no device stores substantially more data than any other device.

> Server/Server - Server/server traffic includes transmissions between servers and transmissions between servers and management applications. Servers talk to other servers to implement directory services, to cache heavily-used data, to mirror data for load balancing and redundancy, to back up data, and to broadcast service availability. Servers talk to management applications for some of the same reasons, but also to enforce security policies and to update network management data. The flow of traffic is generally bi-directional and the symmetry of the flow depends on the application. With most server/server applications, the flow is symmetrical, but in some cases there is a hierarchy of servers, with some servers sending and storing more data than others.

> Distributed Computing - Distributed computing refers to applications that require multiple computing nodes working together to complete a job. Characterizing traffic flows for distributed computing applications most likely will require that the data is studied using a protocol analyzer and/or modeled using a network simulator.

Today's enterprise applications evolved from host/terminal systems. With the explosion of the Internet and the World Wide Web, systems have been transformed into Internet-enabled, multi-tiered applications.

ABC World Industries

In a three-tier architectural environment the user interface (client), the business logic layer (application server) and the database layer (database server) are separated into three distinct components. Each component can have one or more functions. For example, there can be one or more user interfaces in the top tier, and each user interface may communicate with more than one application in the middle tier at the same time. Applications in the middle tier may use more than one database at a time. Components in a tier may run on a computer that is separate from the other tiers, communicating with the other components over a network. In a two-tier architecture the user interface and business logic components are combined into a single layer while the database layer remains separate. The development and advancement of fourth-generation languages (4GL) have helped popularize this approach.

Vendors have moved to three-tier applications primarily to increase scalability. Three-tier architecture reduces network traffic between the client and the application server, which allows more users to operate on the network, and also improves application response time in many instances. In addition multiple servers can be deployed at the mid-tier, which enables the transaction load to be balanced across multiple servers. The following diagram illustrates a simple three-tier architecture.

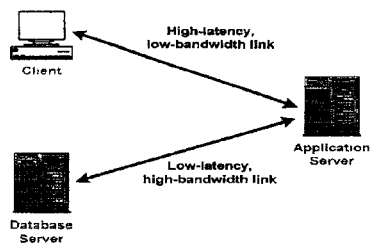

Figure 1: Three-Tier Architecture

In this scheme, thin clients provide users access to the application server to process the business logic; multiple servers can be added to improve scalability. Three-tier applications require a high-bandwidth, low-latency link between the application server and the database server because of the volume of data transferred between the two. The client-to-application server link does not have to be as fast.

It is important to note that not all vendors have created equivalent implementations of multi-tier architectures. Enterprise Resource Planning (ERP) applications from Oracle and SAP are both based on three-tier architectures. However, each one varies in the amount of network traffic it generates. Oracle sends many small messages between the client and the application server, which reduces bandwidth usage but increases susceptibility to network latency. SAP sends large messages, which increases bandwidth usage but reduces susceptibility to network latency.

Many of the ERP vendors provide JAVA-based, Web-enabled clients as well as their proprietary graphical user interface (GUI). Web-based enterprise applications differ from three-tier applications in that they use the standard HTTP protocol for some of the communications between the client and mid-tier, which requires a Web server and potentially an additional layer. The following diagram illustrates the various components.

ABC World Industries

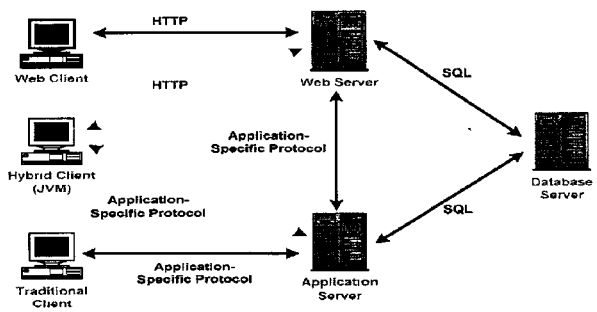

Figure 2: Enterprise Application Network Architecture

Three-tier applications use an application-specific protocol to communicate between the client and the mid-tier. Web-based ERP clients follow a hybrid model. HTTP is used to download a JAVA applet containing the client code, which is executed at the client by a JAVA Virtual Machine (JVM). The JAVA applet then uses the application-specific protocol to communicate with the mid-tier application server. This model uses a Web browser to provide a common user interface, but does not use HTTP for all of the client-to-mid-tier communications. The Web server in an Internet-based application may communicate with the database server directly or indirectly via the application used by traditional clients.

Profiling Methodology

To understand the performance characteristics of an application it is necessary to analyze the data that is generated by all of the associated functional tasks and components, which then serve as a baseline. The key to creating an accurate baseline is to eliminate factors that could adversely affect an application's performance such as router or switch transit delays, multiple router hops, network latency and congestion. Consequently a baseline should not be done across a WAN. Although a local area network (LAN) introduces some degree of network latency and congestion, it does provide a good environment for creating a baseline on how an application truly behaves. This data can be used to do predictive analysis on how an application would perform across a WAN with varying amounts of network latency and bandwidth. This process is also referred to as *application profiling* or *traffic mapping*.

The key is to develop an overall plan detailing usage patterns and traffic priorities. Understand the number and distribution of users, their usage patterns, and the business priorities of the applications. The goal is to determine how much data is generated in each direction along with the complexity of the underlying communication. The complexity of communication is measured in terms of *turns*, which can take place at both the protocol and application level. A turn is defined as a complete request/response transaction or sequence of packets that is either initiated by the protocol or application. Because there is an associated amount of latency with every *turn*, as the number of *turns* increases there may be degradation in response time.

ABC World Industries

The testing process involves a user executing application tasks from a client located on the same LAN segment as the server, and ideally on the same broadcast domain. While the user runs the application, the data is captured. The tasks should represent typical transactions performed by a user on a daily basis. Although any given application typically contains hundreds, if not thousands of commands and functions, experience shows that an application generally exhibits common communication characteristics across a common set of functional tasks. Consequently, it is not necessary to test every aspect of an application to understand how it performs. The data collection process many times has to be done several times during the day or month in order to account for fluctuations in applications usage that can be associated with month-end processing or product rollouts.

The *application profiling* process focuses on several application performance characteristics. The first is application efficiency. Efficiency refers to whether an application's use of the underlying protocol uses bandwidth effectively. Efficiency is affected by frame and packet size, the interaction of protocols used by the application, windowing and flow control, and error-recovery mechanisms. The key to efficiency is to minimize the amount of protocol overhead in order to maximize the amount of payload information (application data) within each packet.

Data symmetry is the comparison between the amount of data that is generated by the client as part of a request and the amount of data that is sent back from the server as part of the response to the original request. Data symmetry is also referred to as the ratio of server to client data. The importance of understanding the data symmetry is that it can help in making cost effective and efficient network design decisions.

Response time is the one of the most important aspects of an application. Regardless of whether an application is "bursty" or whether it communicates efficiently, the bottom line is that when users run the application they expect a certain level of performance. It is important to understand what network components have the greatest impact on an application's response time; this aspect is also called application sensitivity. The goal is to determine whether an application is more sensitive to varying amounts of bandwidth or network latency.

By combining the knowledge of an application's protocol efficiency, data symmetry and sensitivity along with the knowledge of an underlying network infrastructure, an effective solution can be designed which takes advantage of the application's strengths and avoids its weaknesses.

Network Modeling

One of the most difficult tasks of network design is to accurately predict how applications will perform under certain conditions. Over the years tools have been developed which help network designers make informed decisions. The gamut of tools available on the market today range from very bad to very good. Regardless of the quality, to use any tool effectively requires an in-depth understanding of network design principles and application architecture.

Network modeling can be done in one of two ways. The first approach is to use analytical methods. Using mathematical algorithms, estimates can be made of link (or virtual circuits) utilization or network latency. Unfortunately there are some deficiencies with this method. Protocol effects are difficult to capture. Important protocol aspects that are extremely difficult to

ABC World Industries represent in a mathematical network model include data segmentation, congestion control, retransmissions, load balancing across multiple routes, and sophisticated algorithms such as selective acknowledgements in TCP, or weighted fair queuing in IP.

Another approach is to use discrete event simulation methods. By either manually building the unique characteristics of a network and its various components, or drawing upon a library of predefined components, it is possible to generate explicit network traffic and create an accurate baseline. Once this baseline is created, multiple "what if" network design scenarios can be simulated in order to measure a multitude of network and application metrics such as application response time, link utilizations, and throughput. These scenarios can include an increase in the user population over time or the addition of new applications. The advantage of using discrete event simulation methods is that the model can accurately reflect the uniqueness and nuances of a specific application and/or network.

uses a modeling tool that uses a hybrid approach, which combines both analytical and discrete event simulation methods. The advantage of a hybrid approach is that accurate results can be obtained quickly and efficiently.

An important aspect of the application analysis process is the ability to accurately size the connection (network access circuit and network access port) between end-users (remote site) and the application and database servers (host site). To help in this process         has developed a proprietary modeling tool called the *ROI Solution Builder*, which calculates the minimum size of the network access circuit needed to support a given number of users. The modeling tool uses very detailed application information that is collected during the testing period. In addition the *ROI Solution Builder* also provides the ability to compare two design scenarios against one another in order to calculate a financial return on investment.

ABC World Industries

Test Environment
The data collection portion of the analysis took place at ABC's USA facility. The testing consisted of using multiple clients accessing the SAP R/3 system.

- Date				October
				USA

- Client			Microsoft Windows 95
				SAPGUI v4.5B

- Application Server	HP 9000 Series 800
				HP-UX 11.0
				SAP v4.5B

- Database Server		HP-UX 11.0
				Oracle v8.05

- Network			Switched 100Base-T

- Protocol			TCP/IP

The following diagram is a graphical view of the test environment. Although the actual network consists of many more components and there are a total of ten HP 9000 SAP servers, this diagram is the network simulation model that was created in order to baseline the SAP application. During simulation it is not necessary to recreate the production environment exactly.

Figure 3: Test Environment – USA

ABC World Industries

Test Results
The tables on the following pages represent all of the application tasks that were captured during the testing. Many of the statements made in regards to the performance characteristics of a particular application are based on the data from these tables. The following is a description of the fields that appear in the tables.

- Total Bytes — Total bytes transmitted.
- App Turns — Total application turns.
- Bytes/App Turn — Calculation based on Total Bytes / App Turns.
- Client Bytes – Total — Total bytes sent from the client to the server.
- Client Bytes – Payload — Total amount of application data sent from the client to the server.
- Client Bytes – Overhead — Percentage of protocol data sent from the client to the server.
- Server Bytes – Total — Total bytes sent from the server to the client.
- Server Bytes – Payload — Total amount of application data sent from the server to the client.
- Server Bytes – Overhead — Percentage of protocol data sent from the server to the client.
- Ratio — Relationship between Server Total Bytes and Client Total Bytes.
- Duration — Total amount of elapsed time (in seconds).
- Overall Protocol Overhead — Percentage of protocol data transmitted as part of the entire application.
- Overall Server to Client Ratio — Relationship between the sum of all Server Total Bytes and the sum of all Client Total Bytes.
- Average Client Transaction — Geometric mean of Client Total Bytes based on all individual tasks.
- Average Server Transaction — Geometric mean of Server Total Bytes based on all individual tasks.
- RV — Specifies the <u>R</u>eport <u>V</u>ersion

ABC World Industries

SAP - Accounts Payable (RV 8.5)

| | Total Bytes | App Turns | Bytes/App Turn | Client Bytes Total | Payload | Overhead | Server Bytes Total | Payload | Overhead | Ratio | Duration |
|---|---|---|---|---|---|---|---|---|---|---|---|
| Prepare PO Invoice | 14047 | 9 | 1561 | 1982 | 794 | 59.9% | 12065 | 10943 | 9.3% | 6:1 | 46.72 |
| Prepare PO Invoice | 6487 | 4 | 1622 | 894 | 366 | 59.1% | 5593 | 4999 | 10.6% | 6:1 | 11.83 |
| Prepare PO Invoice | 9007 | 5 | 1801 | 1126 | 466 | 58.6% | 7881 | 7155 | 9.2% | 7:1 | 15.54 |
| Prepare PO with Planned Freight | 20520 | 16 | 1283 | 4312 | 2332 | 45.9% | 16208 | 14162 | 12.6% | 4:1 | 49.29 |
| Prepare PO with Planned Freight | 26524 | 18 | 1474 | 4718 | 2474 | 47.6% | 21806 | 19628 | 10.0% | 5:1 | 42.80 |
| Prepare PO with Planned Freight | 26822 | 18 | 1490 | 4698 | 2454 | 47.8% | 22124 | 19880 | 10.1% | 5:1 | 45.27 |
| Prepare Check Request | 16398 | 11 | 1491 | 3357 | 2103 | 37.4% | 13041 | 11523 | 11.6% | 4:1 | 57.02 |
| Prepare Check Request | 16324 | 11 | 1484 | 3322 | 2068 | 37.7% | 13002 | 11484 | 11.7% | 4:1 | 39.80 |
| Prepare Check Request | 19778 | 14 | 1413 | 3973 | 2323 | 41.5% | 15805 | 14155 | 10.4% | 4:1 | 56.61 |
| Manually Approved Invoice | 16548 | 11 | 1504 | 3392 | 2072 | 38.9% | 13156 | 11704 | 11.0% | 4:1 | 55.58 |
| Manually Approved Invoice | 17019 | 11 | 1547 | 3377 | 2057 | 39.1% | 13642 | 12190 | 10.6% | 4:1 | 43.51 |
| Manually Approved Invoice | 16236 | 11 | 1476 | 3291 | 2037 | 38.1% | 12945 | 11427 | 11.7% | 4:1 | 44.79 |
| Freight with Accrual | 17211 | 11 | 1565 | 3438 | 2118 | 38.4% | 13773 | 12453 | 9.6% | 4:1 | 76.67 |
| Freight with Accrual | 25815 | 17 | 1519 | 4673 | 2561 | 45.2% | 21142 | 19228 | 9.1% | 5:1 | 65.06 |
| Freight with Accrual | 25837 | 17 | 1520 | 4687 | 2575 | 45.1% | 21150 | 19236 | 9.0% | 5:1 | 58.27 |
| Freight with Accrual | 15967 | 10 | 1597 | 3185 | 1997 | 37.3% | 12782 | 11462 | 10.3% | 4:1 | 39.94 |

Average client transaction is 3.1KB
Average server transaction is 13.9KB
Overall protocol overhead is 16.6%
Overall server to client ratio is 4:1

Figure 4: Accounts Payable - Test Results

SAP - Accounts Receivable (RV 8.5)

| | Total Bytes | App Turns | Bytes/App Turn | Client Bytes Total | Payload | Overhead | Server Bytes Total | Payload | Overhead | Ratio | Duration |
|---|---|---|---|---|---|---|---|---|---|---|---|
| Posting Wire Transfer | 57877 | 35 | 1654 | 7840 | 3154 | 59.8% | 50037 | 46407 | 7.3% | 6:1 | 204.18 |
| Lock Box Entry - Activation | 24001 | 14 | 1714 | 2876 | 1160 | 59.7% | 21125 | 19277 | 8.7% | 7:1 | 52.04 |
| Lock Box Entry - Activation | 52622 | 37 | 1422 | 7811 | 2927 | 62.5% | 44811 | 41577 | 7.2% | 6:1 | 101.68 |
| Lock Box Entry - Fast Entry | 48485 | 34 | 1426 | 7628 | 3338 | 56.2% | 40857 | 37623 | 7.9% | 5:1 | 463.23 |

Average client transaction is 6.1KB
Average server transaction is 37.3KB
Overall protocol overhead is 15.0%
Overall server to client ratio is 6:1

Figure 5: Accounts Receivable - Test Results

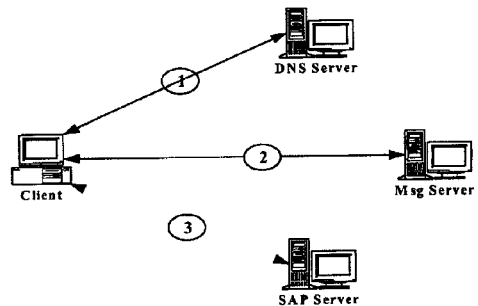

Figure 6: SAP Login Process

ABC World Industries

SAP R/3
Although ABC uses many of the SAP modules the testing for this analysis focused on the accounts payable and accounts receivable components of the Financials module. When the SAP R/2 system is phased out in Europe, users will be migrated over to the SAP R/3 instance in USA, which will have a significant impact on the network usage across the Frame Relay network.

Background
SAP AG (Walldorf, Germany) is a leading manufacturer of an enterprise resource planning software package called SAP R/3 (R/3). R/3 is extremely flexible and provides a company with the ability to integrate all of its business operations (planning, controlling and monitoring) into a central, integrated system. At its core are modules (programs) for accounting and controlling, production and materials management, quality management and plant management, sales and distribution, human resources management, and project management. One of the key advantages of R/3 is that it overcomes the limitations of traditional hierarchical and function-oriented systems by integrating all software components into a single workflow of business events and processes across departments and functional areas.

Designed as an open architecture, R/3 works seamlessly with a variety of systems and applications, which allows for many different options for useful add-on applications and cooperative information processing. The Business Framework, R/3's strategic product architecture, enhances this openness. Although designed as an integrated system, R/3's object-oriented interfaces allow specific business functions to operate as standalone software products, without any loss of integration. Workflow applications automate and control the flow of information, and transport documents such as orders or invoices from one work center to another. Workflow management speeds the flow of budget releases and purchase requisitions, increases the efficiency of change management in engineering/design and manufacturing, and simplifies subsequent processing of documents transmitted by fax or EDI.

R/3 supports a number of different types of clients, hardware platforms, operating systems, and databases and can be configured to operate as either a two-tier or three-tier system. R/3 also provides Internet Application Components, which can be used to provide an HTML-enabled front-end to R/3 applications. The Internet Application Components handle the interaction between the Internet and the R/3 application server and provide firewall transversal capability. The bulk of the transaction is processed at the application server. Transparent load balancing across multiple application servers is also supported; new application servers can be added without users having to reconfigure.

Client services can be deployed using either a standard Web browser (Microsoft Internet Explorer or Netscape Navigator) or using R/3's desktop application called SAPGUI (Windows 3.1, Windows 95/98/NT, OSF/Motif, OS/2 or Macintosh).

All communications between the client, application server, and database server use TCP/IP. Communication between the application server and database server is via SQL using RPC calls. Once an SQL connection is established it is maintained and reused for the duration of the session, which helps minimize the network traffic between the application server and database server by eliminating the necessity of having to constantly establish new TCP connections.

ABC World Industries

When evaluating an application from a performance perspective there are a number of aspects that need to be studied. One of the most important aspects is how the application has been designed and how that design impacts the network. One of SAP's strengths as a software vendor is that the R/3 system was designed to operate as an enterprise application. Although the initial design of R/3 was based on a two-tier architecture, SAP made a successful transition from a two-tier to a three-tier design, which helps in minimizing the traffic that is sent between client and the application server. One of the keys to R/3's efficiency is the way that it sends data from the client to the application server. As a client fills out a page (or screen), the information is sent to the application server in blocks, which increases bandwidth usage but reduces susceptibility to network latency.

Efficiency
Efficiency refers to whether an application uses the underlying bandwidth effectively. Efficiency is affected by frame size, the interaction of protocols used by the application, windowing, flow control, and error-recovery mechanisms. The key to efficiency is to minimize the amount of protocol overhead in order to maximize the amount of payload information (application data) within each packet. The testing revealed that the communications between the client and the application server are very efficient. There are two ways to make this determination.

The first way is to determine the amount of protocol overhead that is used during transmission and the second way is to determine the amount of data that is transferred per application turn. The concept of an application turn was introduced earlier in this document. Every application turn has an associated amount of latency, which means the more information that can be transferred per turn the faster and more efficiently the transaction will complete.

The testing revealed that the *overall* protocol overhead was fairly low and that the "Bytes/App Turn" was high for both accounts payable and accounts receivable. This information is displayed as part of the test results (figures 4 and 5). Another point is that the responses returned from the application server to the client contained much less protocol overhead as compared to the client requests that were made to the application server. This is ideal because although there is much more data flowing from the application server to the client (which can be expected), the transfer of that information is very efficient.

Bandwidth Consumption
Perhaps one of the most difficult aspects of designing a network solution is to determine how much bandwidth an application requires. There are two ways to address this issue. The first is to determine a minimum amount bandwidth that an application will need to operate on a per user basis, which is addressed later in this document. The second aspect is to determine how much the application bursts to consume bandwidth. This is an important aspect to understand because at times of *heavy* usage by many users, if an application tends to burst there needs to be enough bandwidth available on the circuit, irrespective of the underlying network, i.e., Frame Relay, IP, or ATM. If an application tends to perform using a fairly deterministic amount of bandwidth then it is easier to estimate the overall bandwidth requirements based on a given number of users.

Ideally the rate of transmission between various network devices should remain fairly constant. However, over time as applications have become more data intensive and graphically oriented, they have become more demanding. Depending on the task the rate of transmission between a

ABC World Industries client and server could suddenly increase. The term that is typically used to describe this situation is bursty. The effect of bursty traffic is that an application could consume all of the available bandwidth at any given time depending on the task that is being executed.

Although R/3 is efficient in the way that it communicates the application tends to be burst, consuming available bandwidth. A contrast needs to be made between SAP and the way a program such as file transfer protocol (FTP) operates. Depending on the task, SAP will have a momentary burst in activity between the client and the application server, and once the task (or sub-task component) is complete the bandwidth requirement will subside. However, depending on the size of the file transfer, FTP will continue to increase its TCP window size based on the available amount of bandwidth, which will remain in effect for the duration of the file transfer.

The following diagram is an excellent example showing how the application has a lot of spikes during the posting of a wire transfer.

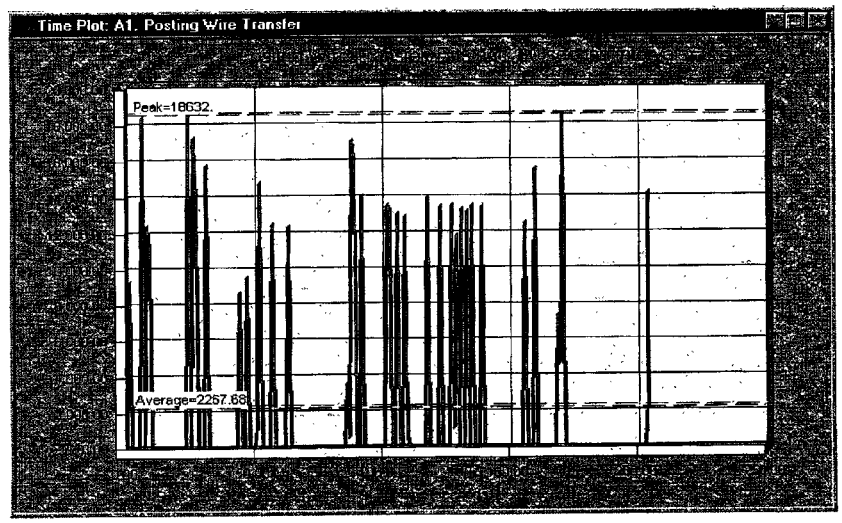

Figure 7: Application Burstiness

ABC World Industries

Sensitivity
Response time is the one of the most important aspects of an application. Regardless of whether an application bursts and consumes bandwidth or whether it communicates efficiently, the bottom line is that when users run the application they expect a certain level of performance. It is important to understand what network components have the greatest impact on an application's response time; this aspect is also called application sensitivity. The goal is to determine whether an application is more sensitive to varying amounts of bandwidth or network latency. The following diagram shows how response time is affected with varying amounts of bandwidth and network latency.

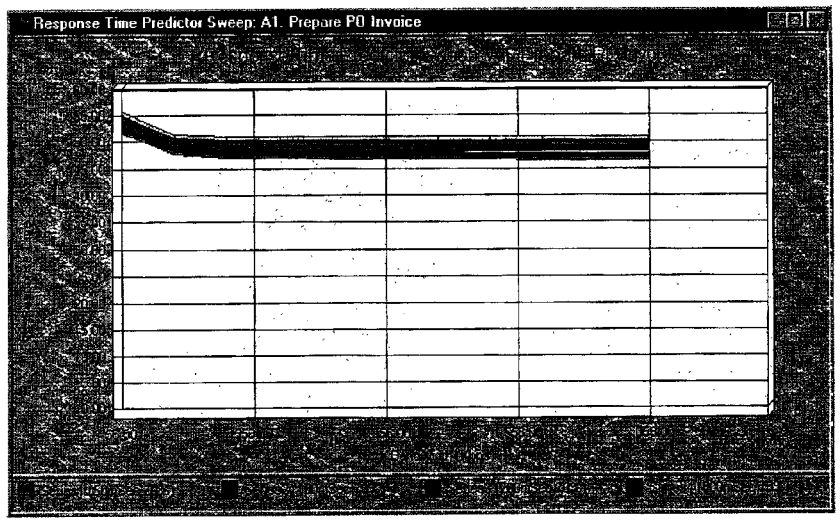

Figure 8: Application Sensitivity

The data on the ordinate (y-axis) represents the response time in seconds. The abscissa (x-axis) represents bandwidth in Kbps. Each of the "Series" at the bottom of the graph shows two numbers. The first is the amount of roundtrip latency that is present between two end-points and the second is the amount of load on the slowest link in the path. The key is to determine which aspect, bandwidth or latency, has a greater impact on the response time of a task. Although it may not appear evident from the above graph, the response time for this particular task is more sensitive to varying amounts of bandwidth. The actual calculation is done using the raw data from the graph. Every task is evaluated using this process. The overall observation is that R/3 has a tendency to be a more sensitive to bandwidth than varying amounts of network latency; response time will continue to improve as more bandwidth becomes available.

ABC World Industries

Data Symmetry

Data symmetry is an important aspect to understand especially if the application is going to be implemented on any transport technology that supports asymmetric traffic flows, such as Frame Relay. By understanding the data symmetry (server to client ratio) a cost effective network solution can be designed that allocates the correct amount of bandwidth in either direction. Although the server to client ratio varies for many of the individual tasks, the overall ratio was observed to vary from 4:1 to 6:1, depending on the component that was tested.

Sizing

One of the primary purposes of this document is to understand the bandwidth requirements for the users accessing the accounts payable and accounts receivable components of the Financials module. This will become an important issue when the SAP R/2 system in Europe is phased out and users start accessing the SAP R/3 instance in Lancaster.

The bandwidth requirements were determined separately for each component in order to help in the planning process as users start migrating over to the SAP R/3 system. It should be noted that all of the login components (as referenced by figure 6) were modeled as part of the simulation. The reason for doing this is to help ABC in the future make decisions on whether or not to redistribute some of the components and how these changes might affect response time.

The following two diagrams are the results of the simulation based on a single user of the accounts payable and accounts receivable components.

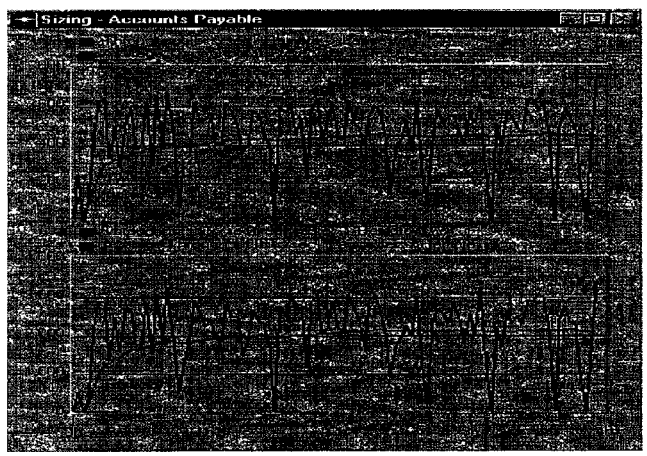

Figure 9: Sizing - Accounts Payable

ABC World Industries

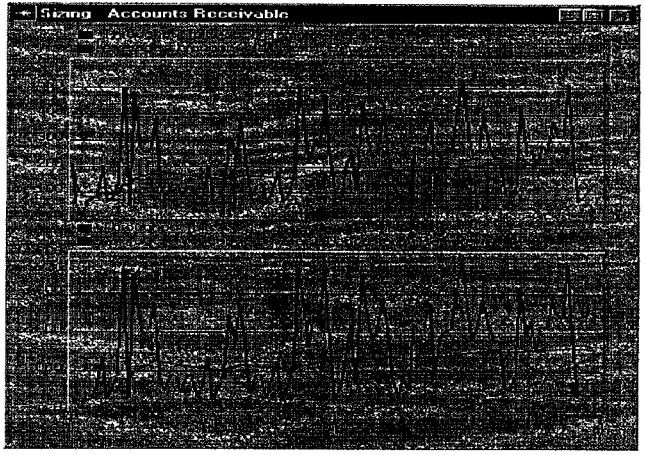

Figure 10: Sizing - Accounts Receivable

The numbers on the ordinate (y-axis) represent throughput in bits/sec and the numbers on the abscissa (x-axis) represent the length of the simulation in hours. Each simulation ran for a total of four hours in order to ensure that enough data points were generated and a trend could be observed.

Based on the test results the following is a summary of the recommended per user requirement for each of the tested components.

|  | Client → Server | Server → Client |
|---|---|---|
| Accounts Payable | 500bps | 2Kbps |
| Accounts Receivable | 200bps | 1.2Kbps |

Proposed Network Design

Over the course of several days and representatives from each of ABC's three business units worked together in order to formulate a tentative network design moving forward based on several factors. The first was past experience and feedback from the user community in regards to network performance. The second was based on the anticipated application usage and distribution across the network.

The following six diagrams are the results of the network re-design and will be used as a basis for moving forward.

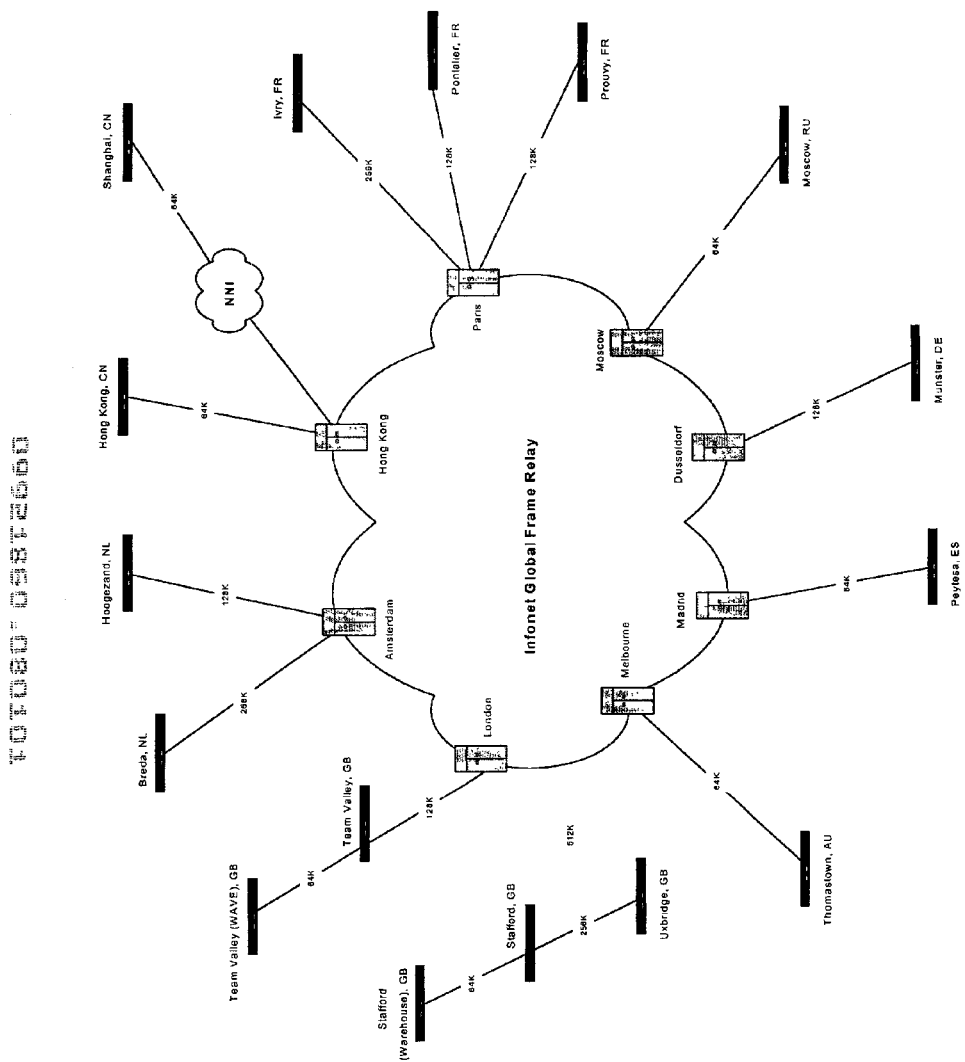
Figure 11: BPO – Circuits

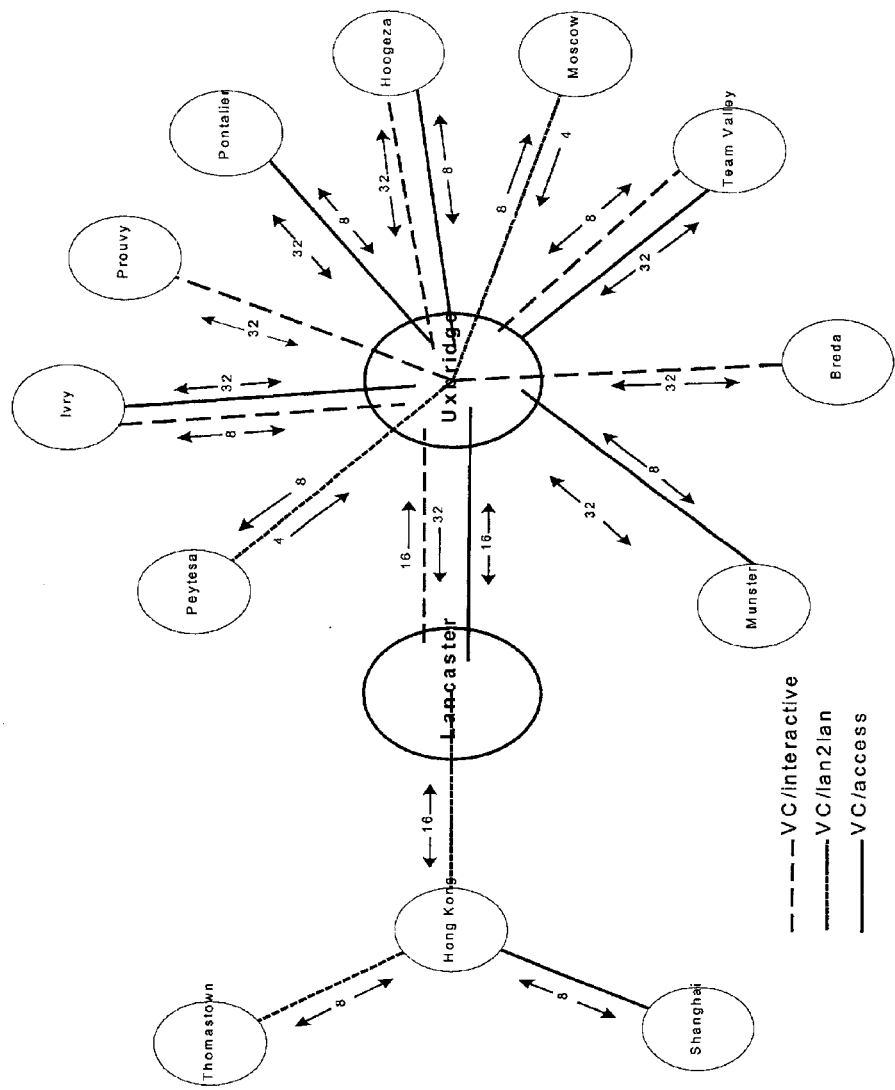
Figure 12: BPO – PVCs

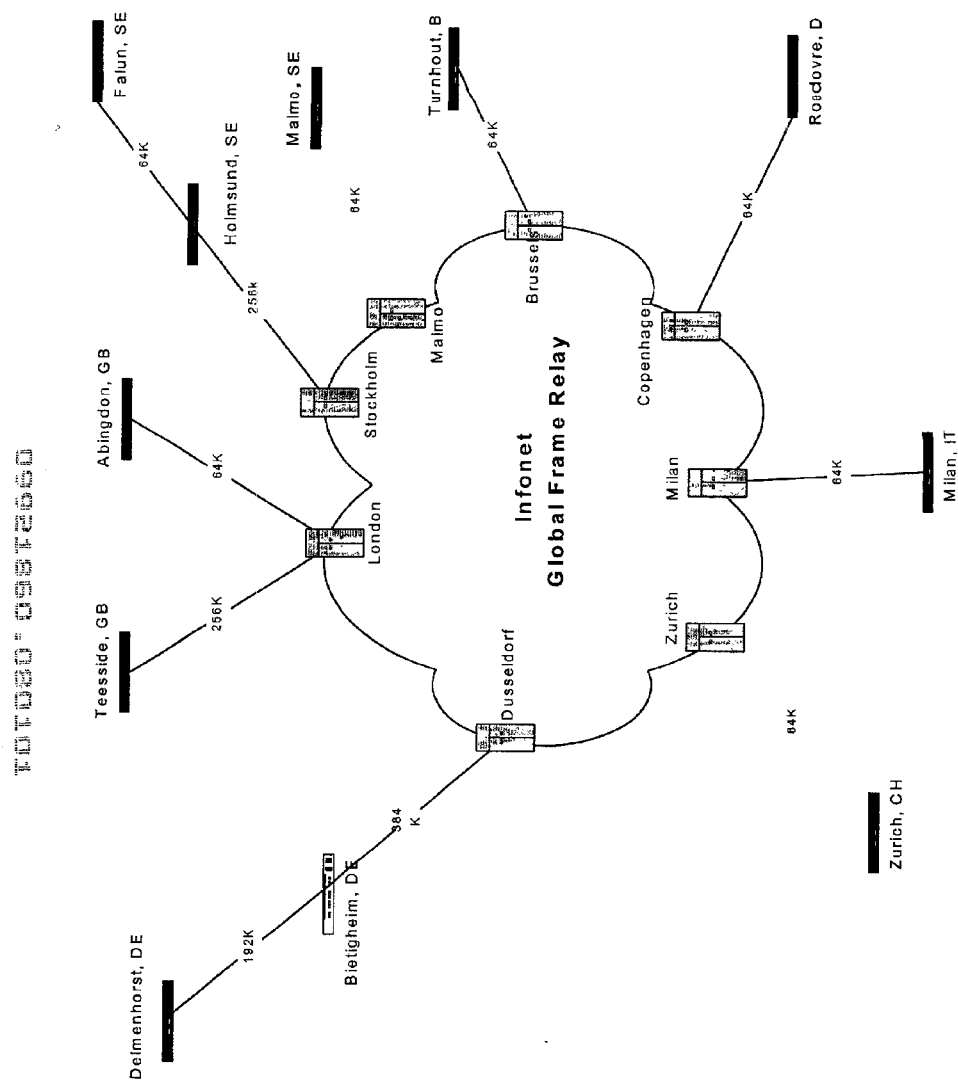
Figure 13: ADE – Circuits

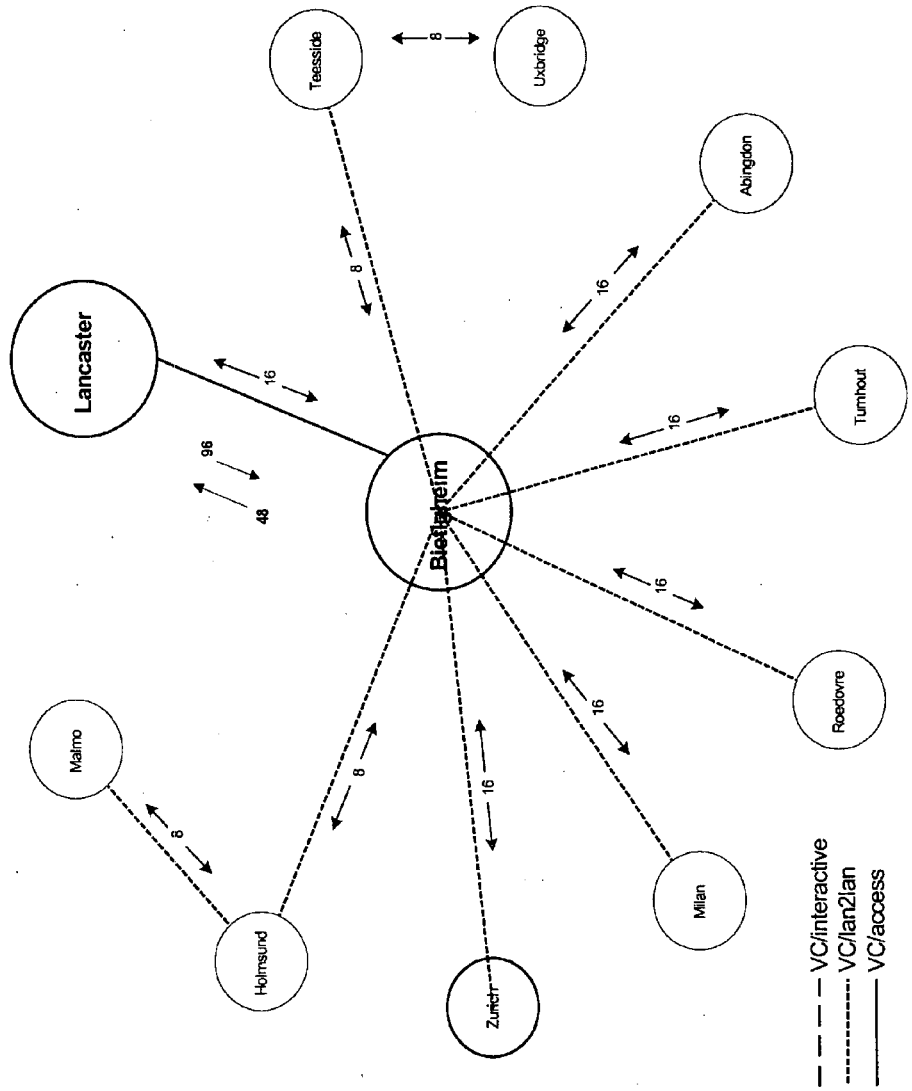
Figure 14: ADE – PVCs

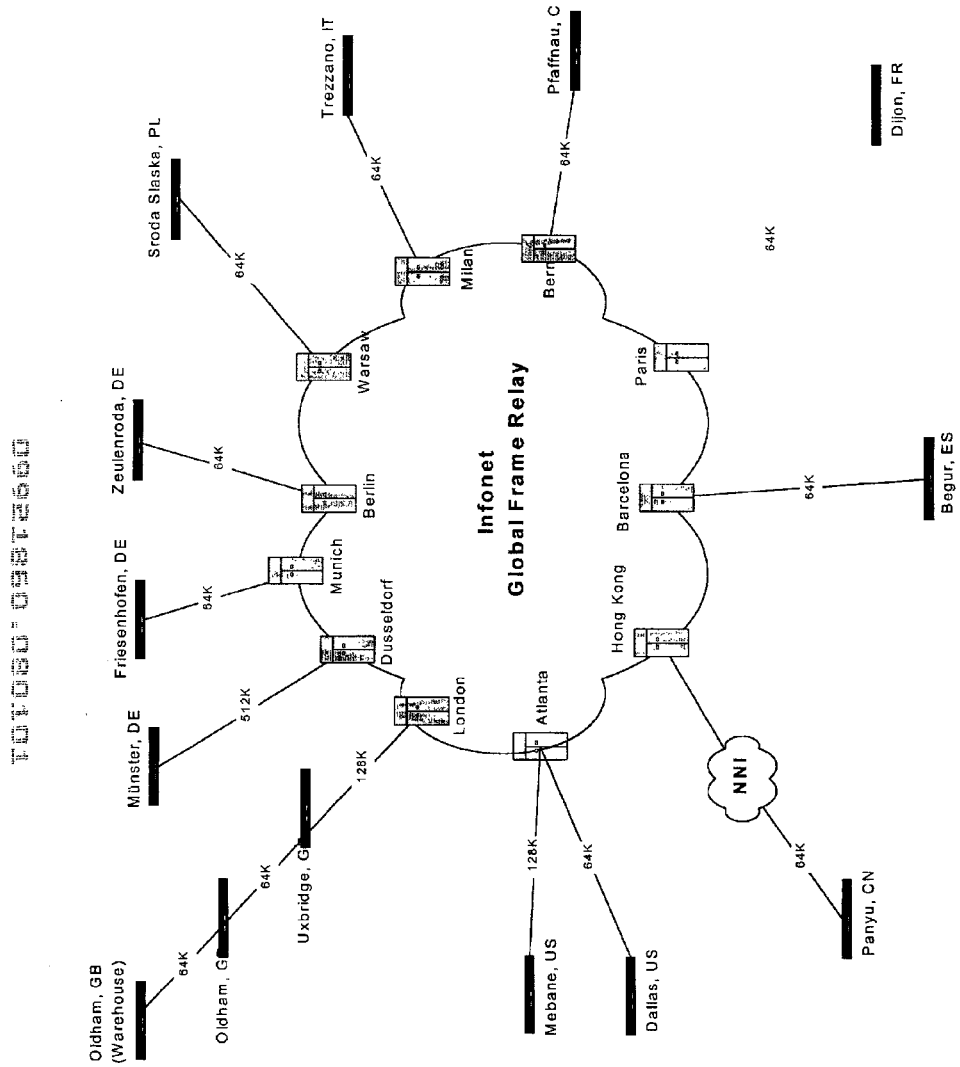
Figure 15: XYZ – Circuits

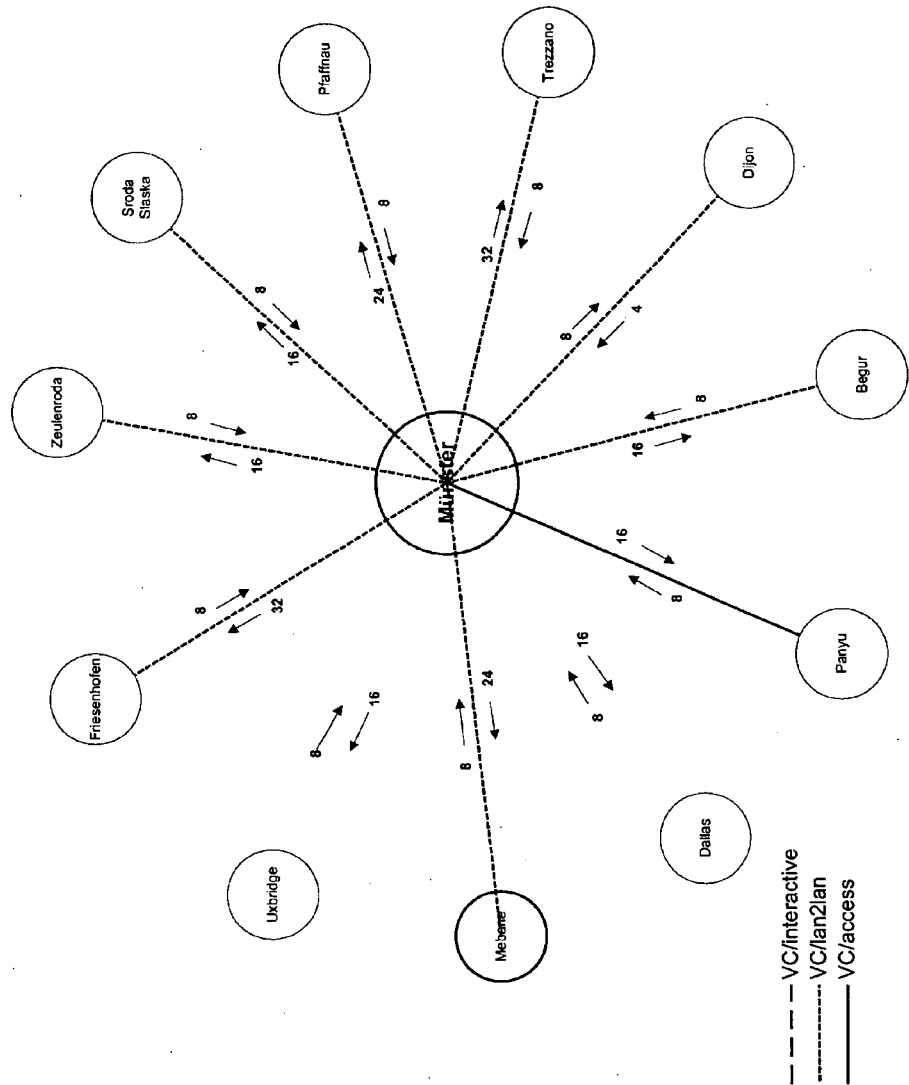
Figure 16: XYZ – PVCs

ABC World Industries

Summary

The purpose of this document was to profile the performance characteristics of two key components of the SAP R/3 Financials module and to establish a network re-design for the BPO, ADE, and XYZ.

Typically when     completes a study it puts forth a series of recommendations that pertain to the issues that were addressed specifically during the analysis. However, this document represents a baseline, a snapshot in time, and should be used as a reference for moving forward as ABC continues to make changes as a result of application migrations and organizational changes dues to the changing complexion of ABC's organizational structure.

anticipates that over time ABC will provide updated information, which can be used as a source for modifying any of the existing components of the current network design.     would like to work closely with ABC during this process. ABC should take advantage of the work that has been done, especially in the area of network modeling and simulation.

What is claimed is:

1. A method for determining a computer network's performance during operation of a software application using the computer network, comprising:
   recording network traffic data while the software application is using the computer network;
   generating from the network traffic data a latency sensitivity metric;
   generating from the network traffic data a bandwidth sensitivity metric; and
   comparing the latency sensitivity metric and the bandwidth sensitivity metric to determine the computer network's performance during operation of the software application.

2. The method of claim 1, wherein generating from the network traffic data the latency sensitivity metric includes:
   generating from the network traffic data a plurality of computer network response times for a plurality of software application use scenarios at a constant computer network bandwidth value; and
   generating the latency sensitivity metric from the plurality of computer network response times.

3. The method of claim 2, wherein the latency sensitivity metric is generated by calculating the standard deviation of the plurality of network response times.

4. The method of claim 2, wherein the latency sensitivity metric is generated by calculating the slope of a line defined by plotting the plurality of computer network response times versus the plurality of software application use scenarios.

5. The method of claim 1, wherein generating from the network traffic data the bandwidth sensitivity metric includes:
   generating from the network traffic data a plurality of computer network response times for a plurality of computer network bandwidth values for a software application use scenario; and
   generating the bandwidth sensitivity metric from the plurality of computer network response times.

6. The method of claim 5, wherein the bandwidth sensitivity metric is generated by calculating the standard deviation of the plurality of network response times.

7. The method of claim 5, wherein the bandwidth sensitivity metric is generated by calculating the slope of a line defined by plotting the plurality of computer network response times versus the plurality of computer network bandwidth values.

8. The method of claim 1, the method further comprising generating from the network traffic data a return on investment data table for use in generating a return on investment metric.

9. The method of claim 1, the method further comprising generating from the network traffic data a computer network simulation table for use in simulating a second computer network.

10. A data processing system adapted to determine a computer network's performance during operation of a software application using the computer network, comprising:
    a processor; and
    a memory operably coupled to the processor and having program instructions stored therein, the processor being operable to execute the program instructions, the program instructions including:
       receiving network traffic data recorded while the software application is using the computer network;
       generating from the network traffic data a latency sensitivity metric;
       generating from the network traffic data a bandwidth sensitivity metric; and
       comparing the latency sensitivity metric and the bandwidth sensitivity metric to determine the computer network's performance during operation of the software application.

11. The data processing system of claim 10, wherein the program instructions for generating from the network traffic data the latency sensitivity metric further include:
    generating from the network traffic data a plurality of computer network response times for a plurality of software application use scenarios at a constant computer network bandwidth value; and
    generating the latency sensitivity metric from the plurality of computer network response times.

12. The data processing system of claim 11, wherein the latency sensitivity metric is generated by calculating the standard deviation of the plurality of network response times.

13. The data processing system of claim 11, wherein the latency sensitivity metric is generated by calculating the slope of a line defined by plotting the plurality of computer network response times versus the plurality of software application use scenarios.

14. The data processing system of claim 10, wherein the program instructions for generating from the network traffic data the bandwidth sensitivity metric further include:
    generating from the network traffic data a plurality of computer network response times for a plurality of computer network bandwidth values for a software application use scenario; and
    generating the bandwidth sensitivity metric from the plurality of computer network response times.

15. The data processing system of claim 14, wherein the bandwidth sensitivity metric is generated by calculating the standard deviation of the plurality of network response times.

16. The data processing system of claim 14, wherein the bandwidth sensitivity metric is generated by calculating the slope of a line defined by plotting the plurality of computer network response times versus the plurality of computer network bandwidth values.

17. The data processing system of claim 10, the program instructions further including generating from the network traffic data a return on investment data table for use in generating a return on investment metric.

18. The data processing system of claim 10, the program instructions further including generating from the network traffic data a computer network simulation table for use in simulating a second computer network.

19. A computer readable media embodying computer program instructions for execution by a computer, the computer program instructions adapting a computer to determine a computer network's performance during operation of a software application using the computer network, the computer instructions comprising:
    receiving network traffic data recorded while the software application is using the computer network;
    generating from the network traffic data a latency sensitivity metric;
    generating from the network traffic data a bandwidth sensitivity metric; and
    comparing the latency sensitivity metric and the bandwidth sensitivity metric to determine the computer network's performance during operation of the software application.

20. The computer readable media of claim 19, wherein the program instructions for generating from the network traffic data the latency sensitivity metric further include:

generating from the network traffic data a plurality of computer network response times for a plurality of software application use scenarios at a constant computer network bandwidth value; and generating the latency sensitivity metric from the plurality of computer network response times.

21. The computer readable media of claim 20, wherein the latency sensitivity metric is generated by calculating the standard deviation of the plurality of network response times.

22. The computer readable media of claim 21, wherein the latency sensitivity metric is generated by calculating the slope of a line defined by plotting the plurality of computer network response times versus the plurality of software application use scenarios.

23. The computer readable media of claim 19, wherein the program instructions for generating from the network traffic data the bandwidth sensitivity metric further include:

generating from the network traffic data a plurality of computer network response times for a plurality of computer network bandwidth values for a software application use scenario; and generating the bandwidth sensitivity metric from the plurality of computer network response times.

24. The computer readable media of claim 23, wherein the bandwidth sensitivity metric is generated by calculating the standard deviation of the plurality of network response times.

25. The computer readable media of claim 23, wherein the bandwidth sensitivity metric is generated by calculating the slope of a line defined by plotting the plurality of computer network response times versus the plurality of computer network bandwidth values.

26. The computer readable media of claim 19, the program instructions further comprising generating from the network traffic data a return on investment data table for use in generating a return on investment metric.

27. The computer readable media of claim 19, the program instructions further comprising generating from the network traffic data a computer network simulation table for use in simulating a second computer network.

* * * * *